United States Patent
Haque et al.

(10) Patent No.: US 10,551,199 B2
(45) Date of Patent: Feb. 4, 2020

(54) UTILIZING ARTIFICIAL NEURAL NETWORKS TO EVALUATE ROUTES BASED ON GENERATED ROUTE TILES

(71) Applicant: Lyft, Inc., San Francisco, CA (US)

(72) Inventors: Asif Haque, Orinda, CA (US); James Kevin Murphy, San Francisco, CA (US); Yuanyuan Malek, San Francisco, CA (US)

(73) Assignee: Lyft, Inc., San Franciscio, CA (US)

( * ) Notice: Subject to any disclaimer, the term of this patent is extended or adjusted under 35 U.S.C. 154(b) by 119 days.

(21) Appl. No.: 15/858,775

(22) Filed: Dec. 29, 2017

(65) Prior Publication Data
US 2019/0204088 A1    Jul. 4, 2019

(51) Int. Cl.
*G01C 21/00*   (2006.01)
*G01C 21/30*   (2006.01)
*G06N 3/02*    (2006.01)
*G06N 5/02*    (2006.01)

(52) U.S. Cl.
CPC ............. *G01C 21/30* (2013.01); *G06N 3/02* (2013.01); *G06N 5/027* (2013.01)

(58) Field of Classification Search
None
See application file for complete search history.

(56) References Cited

U.S. PATENT DOCUMENTS

| | | | |
|---|---|---|---|
| 10,060,751 B1* | 8/2018 | Chen | G01C 21/32 |
| 2011/0112760 A1* | 5/2011 | Serbanescu | G01C 21/32 |
| | | | 701/465 |
| 2015/0304634 A1* | 10/2015 | Karvounis | H04N 13/239 |
| | | | 348/46 |
| 2017/0314934 A1* | 11/2017 | Averbuch | G01C 21/30 |
| 2019/0026591 A1* | 1/2019 | Fowe | G06K 9/4609 |
| 2019/0103019 A1* | 4/2019 | Fowe | G08G 1/0133 |

* cited by examiner

*Primary Examiner* — Thomas G Black
*Assistant Examiner* — Demetra R Smith-Stewart
(74) *Attorney, Agent, or Firm* — Keller Jolley Preece

(57) ABSTRACT

This disclosure covers methods, non-transitory computer readable media, and systems that generate route tiles reflecting both GPS locations and map-matched locations for regions along a route traveled by a client device associated with a transportation vehicle. For example, in some implementations, the disclosed systems use an artificial neural network to analyze the route tiles and determine route-accuracy metrics indicating GPS locations or map-matched locations for particular regions along the route. The disclosed systems can then use the route-accuracy metrics to facilitate transport of requestors by, for example, determining a distance of the route or a location of a client device associated with a transportation vehicle.

20 Claims, 15 Drawing Sheets

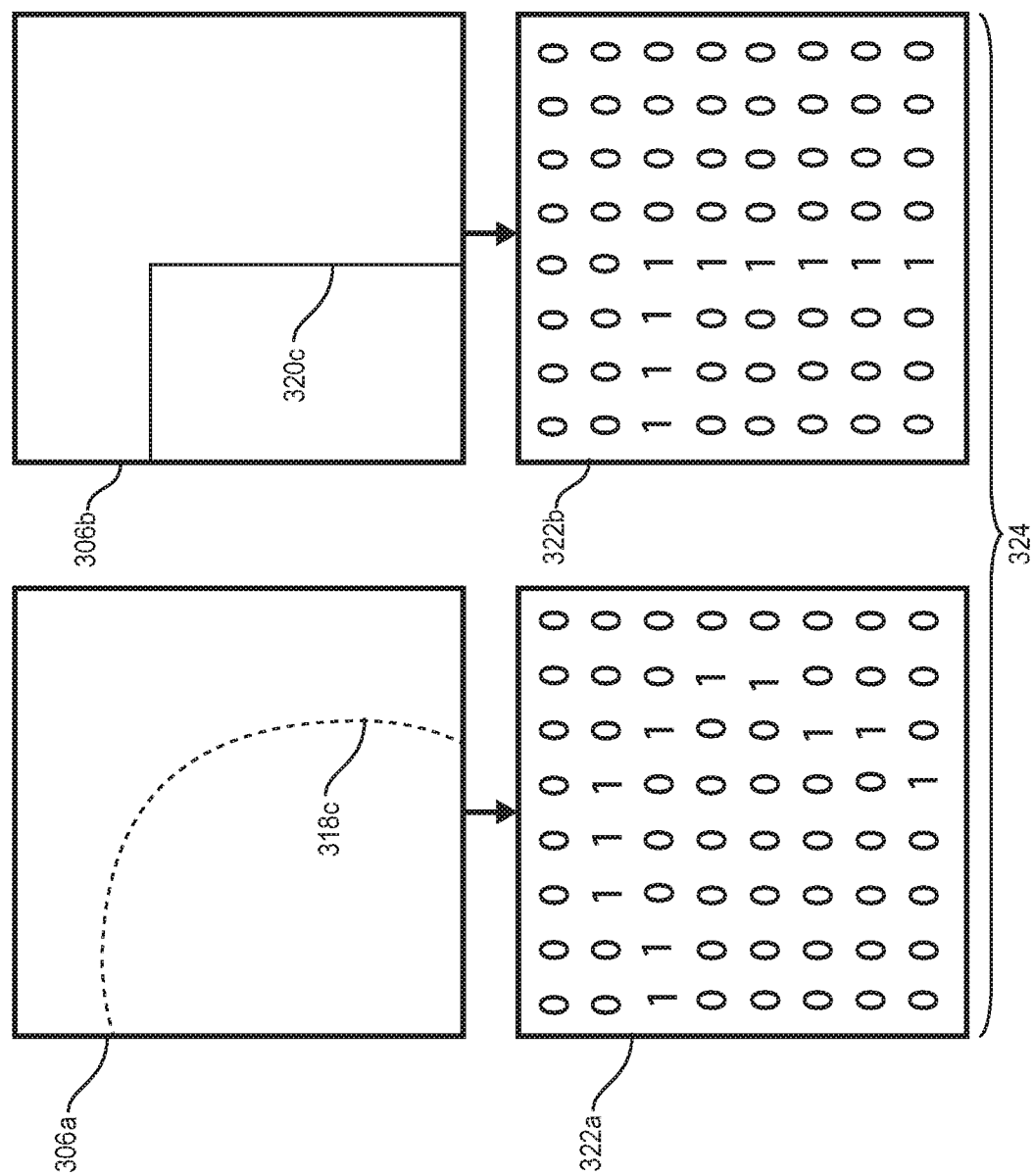

UTILIZING ARTIFICIAL NEURAL NETWORKS TO EVALUATE ROUTES BASED ON GENERATED ROUTE TILES

BACKGROUND

Transportation routing systems increasingly use tracking technologies to determine the location and routes traveled by vehicles and computing devices carried by such vehicles. For instance, conventional transportation routing systems use computing devices that employ Global Positioning System ("GPS") to determine traffic patterns, driver habits, or digital maps of a road network. Tracking devices that use GPS can often improve or provide the data for determining vehicles' locations, routes, and patterns.

Despite improving route detection, conventional GPS-based routing systems sometimes generate or receive inaccurate GPS data. For instance, conventional GPS-based routing systems often generate or receive noisy GPS data indicating incorrect locations of a computing device along a route. Such GPS data may indicate locations within a route that would require a vehicle to accelerate or travel at magnitudes that the vehicle could not exhibit based on standard driving patterns or the laws of physics. For example, noisy GPS data sometimes indicates a vehicle rapidly changing from one latitudinal or longitudinal location to another such location, such as at an intersection with a traffic light. Several factors may cause noisy GPS data, such as a faulty GPS device, the landscape of the area in which a computing device is located, or the speed at which the computing device travels. Accordingly, conventional GPS-based routing systems sometimes inaccurately determine a vehicle's location or route based on noisy GPS data.

To correct for the inaccuracies of GPS data, some conventional map-match routing systems adjust GPS data to predict a vehicle's location within roads of a digital map. For instance, some conventional map-match routing systems use GPS data from a computing device to estimate locations along roads of a digital map. But conventional map-match routing systems require up-to-date maps, among other things, to accurately determine a vehicle's location and routes traveled. Developing such digital maps often requires collecting satellite imagery, managing a mapping fleet of vehicles, and purchasing large amounts of traffic data.

Notwithstanding the expense and difficulty of creating digital maps, conventional map-match routing systems often inaccurately determine the location and routes of vehicles. For example, conventional map-match routing systems sometimes determine a vehicle is located on a non-existent (or incorrect) road based on (i) algorithms that inaccurately match GPS data to roads or (ii) faulty digital maps. After construction of a new road, for example, conventional map-match routing systems may take months (or more) to identify the new road and update the map using a minimum number of observed-data points and an offline process for adjusting the map.

Both conventional GPS-based routing systems and conventional map-match routing systems pose significant technical limitations for on-demand service matching systems that provide transportation vehicles to requestors. On-demand service matching systems often need to accurately determine a location and route of a vehicle in real time (or near real time) to match transportation vehicles with requestors and to accurately determine prices for transport. The inaccuracy and slow adjustment mechanisms of conventional GPS-based routing systems and conventional map-match routing systems inhibit such on-demand service matching systems from determining locations, distances, and/or routes for transport.

SUMMARY

This disclosure describes one or more embodiments of methods, non-transitory computer readable media, and systems that solve the foregoing problems in addition to providing other benefits. For example, in one or more embodiments, the disclosed systems generate route tiles reflecting both GPS locations and map-matched locations for regions along a route traveled by a client device associated with a transportation vehicle. In some implementations, the disclosed systems use an artificial neural network to analyze the route tiles and determine route-accuracy metrics indicating GPS locations or map-matched locations for particular regions along the route. The disclosed systems can then use the route-accuracy metrics to facilitate transport of requestors by, for example, determining a distance of the route or a location of a client device associated with a transportation vehicle.

In some embodiments, for instance, the systems identify both training GPS locations and training map-matched locations for a training route traveled by a client device associated with a transportation vehicle. The systems can further generate regions along the training route. For instance, a region can include a subset of training GPS locations and a subset of training map-matched locations. Based on the subset of training GPS locations and the subset of training map-matched locations, the systems generate a training route tile for the region. The systems then use an artificial neural network to predict a route-accuracy metric for the region based on the training route tile. By comparing the route-accuracy metric to a ground-truth-route-accuracy metric for the region, the systems train the artificial neural network. In addition to training the artificial neural network, in certain embodiments, the systems use the network to analyze route tiles corresponding to a route traveled by a client device and to determine route-accuracy metrics for regions along the route.

The disclosed systems avoid the deficiencies of conventional transportation routing systems. By using an artificial neural network to predict route-accuracy metrics for route tiles, the disclosed systems can more accurately determine distances traveled by (or locations of) a client device associated with a transportation vehicle. Unlike conventional transportation routing systems, the disclosed systems avoid the inaccuracies of noisy GPS data and map-matched data by determining route-accuracy metrics for specific regions along a route, which indicate to the systems to rely on GPS locations or map-matched locations for particular regions. In addition, unlike the rigidity of conventional map-match systems, the disclosed system's artificial neural network creates a more flexible analysis of route distances, estimated paths, and/or client device locations.

BRIEF DESCRIPTION OF THE DRAWINGS

The detailed description refers to the drawings briefly described below.

FIGS. 3A-3B illustrate regions along a route corresponding to GPS locations and map-matched locations, a particular region along the route corresponding to GPS locations and map-matched locations, and a route tile in accordance with one or more embodiments.

DETAILED DESCRIPTION

Figure 1:
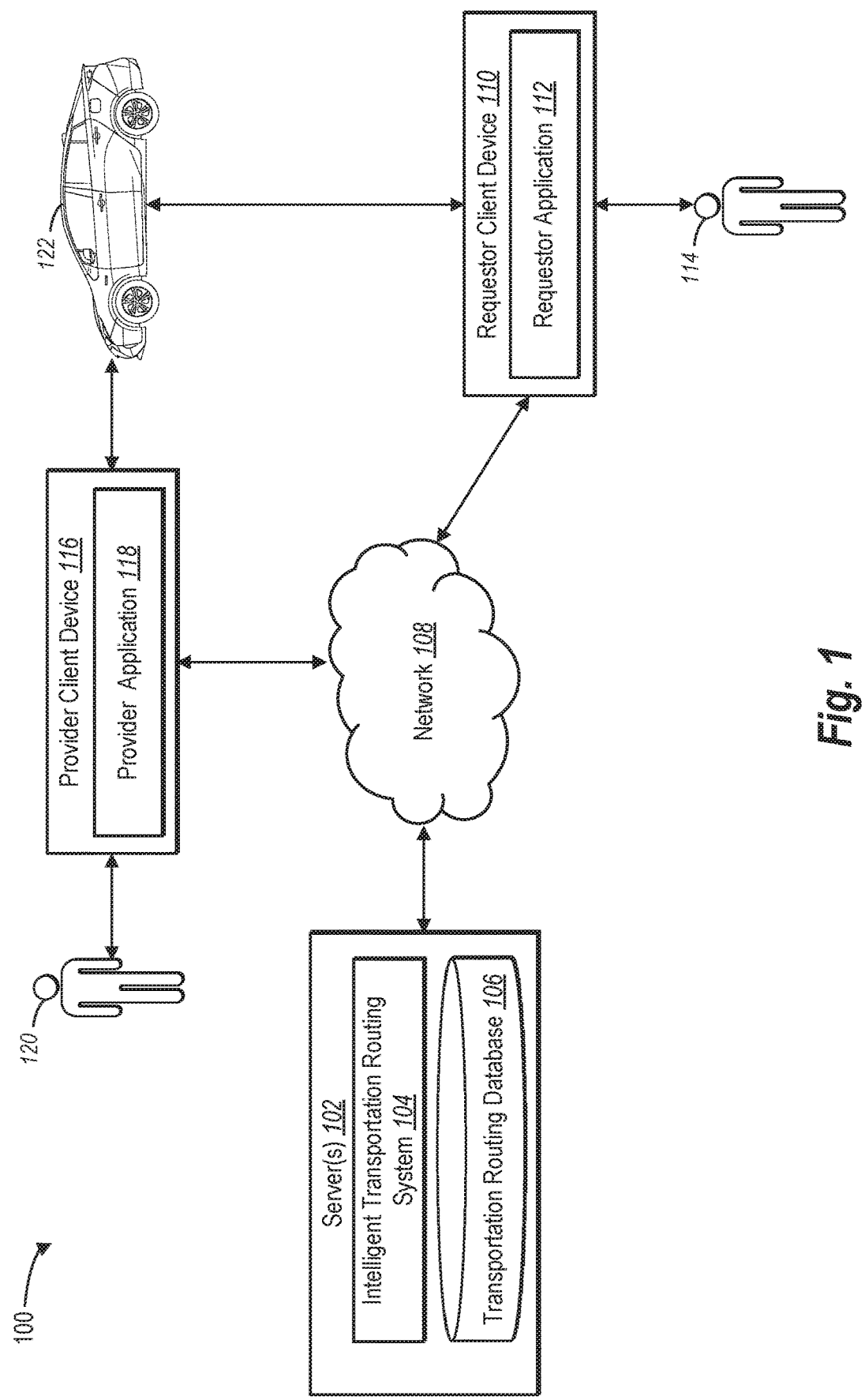
FIG. 1 illustrates a block diagram of an environment for implementing an intelligent transportation routing system in accordance with one or more embodiments.

This disclosure describes one or more embodiments of a transportation routing system that utilizes an artificial neural network to evaluate routes based on generated route tiles. For example, in one or more embodiments, the intelligent transportation routing system analyzes a route traveled by a client device associated with a transportation vehicle and generates route tiles representing GPS locations and map-matched locations for regions along the route. In some implementations, the intelligent transportation routing system inputs the route tiles into an artificial neural network to determine route-accuracy metrics indicating GPS locations or map-matched locations for particular regions along the route. A route-accuracy metric may, for example, indicate a noise level for a subset of GPS locations corresponding to a region of the route. In certain embodiments, the intelligent transportation routing system uses the route-accuracy metrics to facilitate transport of requestors by determining a distance of the route or a location of a client device associated with a transportation vehicle.

In some embodiments, for instance, the intelligent transportation routing system identifies both training GPS locations and training map-matched locations for a training route traveled by a client device associated with a transportation vehicle. The intelligent transportation routing system can further generate regions along the training route. For example, the intelligent transportation routing system can generate a region comprising a subset of training GPS locations and a subset of training map-matched locations. Based on the subset of training GPS locations and the subset of training map-matched locations, the intelligent transportation routing system can generate a training route tile for the region. In one or more embodiments, the intelligent transportation routing system then uses an artificial neural network to predict a route-accuracy metric for the region based on the training route tile. By comparing the route-accuracy metric to a ground-truth-route-accuracy metric for the region, the intelligent transportation routing system can train the artificial neural network.

In addition to training an artificial neural network, the intelligent transportation routing system can also use an artificial neural network to analyze route tiles to determine route-accuracy metrics. For example, in some embodiments, the intelligent transportation routing system identifies a set of GPS locations and a corresponding set of map-matched locations for a route traveled by a client device. The intelligent transportation routing system then segments the set of GPS locations and the corresponding set of map-matched locations into regions along the route. Each such region comprises a subset of GPS locations and a subset of map-matched locations. In some embodiments, the intelligent transportation routing system generates route tiles for individual regions along the route.

In one or more embodiments, the intelligent transportation routing system then uses the trained artificial neural network to determine a route-accuracy metric for each region. The intelligent transportation routing system further selects, for each region, one of the subset of GPS locations or the subset of map-matched locations based on the route-accuracy metric. The intelligent transportation routing system determines updates the route to include the selected subset of GPS locations or the selected subset of map-matched locations for each region. For example, the intelligent transportation routing system updates the route by determining a distance of the route based on the selected subset of GPS locations or the selected subset of map-matched locations for each region. Additionally, or alternatively, the intelligent transportation routing system updates the route by adjusting a digital map for the region to correspond to the selected subset of GPS locations or the selected subset of map-matched locations for each region. Moreover, in some embodiments, the intelligent transportation routing system updates the route by determining a location of the client device based on a route-accuracy metric.

As just mentioned, the intelligent transportation routing system can utilize training GPS locations and training map-matched locations to generate training route tiles and a trained neural network. To illustrate, in certain embodiments, a training route tile includes two image matrices. In particular, a first image matrix can include representations of a subset of training GPS locations for a region. In addition, a second image matrix can include representations of a training subset of map-matched locations for the region.

As noted above, in certain embodiments, the intelligent transportation routing system also inputs training route tiles into an artificial neural network to predict a route-accuracy metric for a region. The route-accuracy metric may take different forms to indicate a subset of training GPS locations (or a subset of training map-matched locations) for a particular region. For example, in some implementations, a route-accuracy metric may be an accuracy classifier that indicates a predicted noise level for a subset of training GPS locations corresponding to a region along the training route.

When training the artificial neural network, in some embodiments, the intelligent transportation routing system compares a ground-truth-route-accuracy metric to a predicted route-accuracy metric for a given region's training route tile. Based on the comparison between the ground-truth-route-accuracy metric and the predicted route-accuracy metric, the intelligent transportation routing system adjusts parameters of the artificial neural network to reflect the ground-truth-route-accuracy metric. Accordingly, the intelligent transportation routing system can utilize ground-truth-route-accuracy metric to train the artificial neural network to generate improved route accuracy predictions.

The intelligent transportation routing system may also use different types of training data (e.g., measured training data or synthetic training data) to train an artificial neural network. For instance, in some embodiments, the intelligent transportation routing system receives GPS locations detected by a client device along a training route. The intelligent transportation routing system then uses the detected GPS locations to create regions along the training route and generate training route tiles for the regions. In some embodiments, the intelligent transportation routing system simulates route locations for the training route and then transforms the simulated route locations into simulated training GPS locations. By simulating the training GPS locations along a training route, the intelligent transportation routing system can generate and utilize synthetic route tiles as training route tiles.

Having trained the artificial neural network, in certain embodiments, the intelligent transportation routing system applies the trained artificial neural network to new routes corresponding to new GPS locations and new map-matched data. For example, the transportation routing system can generate route tiles for regions along a new route. After generating route tiles, the transportation routing system can provide the route tiles as input into the trained artificial neural network. The transportation routing system can utilize the trained artificial neural network to analyze the route tiles and determine route-accuracy metrics for the route tiles. By determining a route-accuracy metric for multiple regions along the new route, the intelligent transportation routing system creates a basis for evaluating the entire new route.

For example, in some embodiments, the intelligent transportation routing system determines a noise level for subsets of GPS locations corresponding to multiple regions. The transportation routing system can then determine more accurate distances and/or location measures for the regions. For example, the intelligent transportation routing system can determine a more accurate route distance by relying on GPS locations in low-noise regions and relying on map-matched data in high-noise regions. Similarly, the intelligent transportation routing system can determine a more accurate location of the client device along the route within any particular region.

In addition to determining distances or locations, in certain embodiments, the intelligent transportation routing system can also modify digital maps to more accurately reflect location data. For example, in certain embodiments, the intelligent transportation routing system may determine that route-accuracy metrics for multiple route tiles indicate inaccuracies in underlying digital maps. Based on such observations, in certain embodiments, the intelligent transportation routing system adjusts the digital map for a region to correspond to a subset of GPS locations.

The disclosed intelligent transportation routing system overcomes several technical deficiencies that hinder conventional transportation routing systems. For example, the intelligent transportation routing system more accurately estimates distances traveled by (or locations of) a client device associated with a transportation vehicle. By using an artificial neural network to determine route-accuracy metrics for route tiles, the intelligent transportation routing system can determine whether to rely on GPS locations or map-matched locations for particular regions along a route. Accordingly, the disclosed intelligent transportation routing system can determine when relatively clean GPS locations (or map-matched locations) deliver a more accurate representation of the route.

In addition to providing a more accurate evaluation of routes, in certain embodiments, the intelligent transportation routing system improves flexibility of computing systems evaluating transportation routes. As suggested above, the intelligent transportation routing system can use route tiles and corresponding route-accuracy metrics to rely on different location data sources within different regions. Rather than relying solely on map-matched locations, the intelligent transportation routing system exploits an artificial neural network to indicate GPS locations or map-matched locations for a particular region along a route. This use of an artificial neural network allows for flexible use of different location data and better route evaluation.

The intelligent transportation routing system's flexibility likewise enables it to correct digital maps faster than existing transportation routing systems. Indeed, the intelligent transportation routing system can detect differences between GPS locations and map-matched locations in real time (or near real time). As client devices send GPS locations for a region that are inconsistent with map-matched locations for the same region, the intelligent transportation routing system can expeditiously adjust a digital map to reflect the GPS locations.

Turning now to the figures, FIG. 1 illustrates a schematic diagram of an environment 100 for implementing an intelligent transportation routing system 104 in accordance with one or more embodiments. This disclosure provides an overview of the intelligent transportation routing system 104 with reference to FIG. 1. After providing an overview, the disclosure describes components and processes of the intelligent transportation routing system 104 in further detail with reference to subsequent figures.

As shown in FIG. 1, the environment 100 includes server(s) 102, a requestor client device 110, a provider client device 116, and a network 108. The requestor client device 110 is associated with a requestor 114, and the provider client device 116 is associated with a provider 120. Both the requestor client device 110 and the provider client device 116 are associated with a transportation vehicle 122. As FIG. 1 suggests, the provider 120 provides transportation to the requestor 114 using the transportation vehicle 122.

As further shown in FIG. 1, the server(s) 102 include an intelligent transportation routing system 104 and a transportation routing database 106. The intelligent transportation routing system 104 utilizes the network 108 to communicate through the server(s) 102 with the requestor client device 110 and the provider client device 116. For example, the intelligent transportation routing system 104, via the server(s) 102, communicates with the requestor client device 110 and the provider client device 116 via the network 108 to determine locations of the requestor client device 110 and the provider client device 116. Per device settings, for instance, the intelligent transportation routing system 104 can utilize the server(s) 102 to receive GPS locations from the requestor client device 110 or the provider client device 116 to estimate a route traveled by the requestor client device 110 or the provider client device 116, respectively.

As used in this disclosure, the term "GPS location" refers to data indicating a computing device's location using a Global Positioning System (or similar system, such as Global System for Mobile Communications). For example, a GPS location includes altitudinal, longitudinal, and/or latitudinal coordinates or degrees that the requestor client device 110 or the provider client device 116 sends to the server(s) 102 and the intelligent transportation routing system 104. In some instances, the intelligent transportation routing system 104 receives data from such a client device encoded to represent a GPS location in various standard GPS formats, such as degrees, minutes, and seconds ("DMS"); degrees and decimal minutes ("DMM"), or decimal degrees ("DD").

As suggested above, GPS locations may indicate a route traveled by the requestor client device 110 or the provider client device 116. The term "route" refers to a course traveled from one location to another location. In particular, a route includes a course traveled by a client device from a starting location to a destination location. For example, a route may include a course traveled by the requestor client device 110 in the transportation vehicle 122 while the transportation vehicle 122 transports the requestor 114 from a pickup location to a destination location. As another example, a route may include a course traveled by the provider client device 116 in the transportation vehicle 122 after the provider 120 drops off the requestor 114 and travels to a different location.

As suggested above, the term "requestor" refers to person who requests a ride or other form of transportation from the intelligent transportation routing system 104. A requestor may refer to a person who requests a ride or other form of transportation but who is still waiting for pickup. A requestor may also refer to a person whom a transportation vehicle has picked up and who is currently riding within the transportation vehicle to a destination (e.g., a destination indicated by a requestor).

Relatedly, the term "requestor client device" refers to a computing device associated with (or used by) a requestor. A requestor client device includes a mobile device, such as a laptop, smartphone, or tablet associated with a requestor. But the requestor client device 110 may also be any type of computing device as further explained below with reference to FIG. 13. The requestor client device 110 includes a requestor application 112. In some embodiments, the requestor application 112 comprise a web browser, applet, or other software application (e.g., native application) available to the requestor client device 110.

A requestor may interact with a requestor application to request transportation services, receive a price estimate for the transportation service, and access other transportation-related services. For example, the requestor 114 may interact with the requestor client device 110 through graphical user interfaces of the requestor application 112 to input a pickup location or a destination location for transportation. The intelligent transportation routing system 104, via the server(s) 102, in turn provides the requestor client device 110 with a price estimate for the transportation and an estimated time of arrival of the provider 120 (or the transportation vehicle 122) through the requestor application 112. Having received the price estimate and estimated time of arrival, the requestor 114 may then select (and the requestor client device 110 detect) a transportation-request option to request transportation services from the intelligent transportation routing system 104.

Relatedly, the term "provider" refers to a driver or other person who operates a transportation vehicle and/or who interacts with a provider client device. For instance, a provider includes a person who drives a transportation vehicle along various routes to pick up and drop off requestors. As shown in FIG. 1, in certain embodiments, the transportation vehicle 122 includes or is associated with a provider. However, in other embodiments, the transportation vehicle 122 does not include a provider, but is instead an autonomous transportation vehicle—that is, a self-driving vehicle that includes computer components and accompanying sensors for driving without manual-provider input from a human operator.

As noted above, both the provider 120 and the transportation vehicle 122 are associated with the provider client device 116. The term "provider client device" refers to a computing device associated with a provider or a transportation vehicle. The provider client device 116 may be separate or integral to the transportation vehicle 122. For example, the provider client device 116 may refer to a separate mobile device, such as a laptop, smartphone, or tablet associated with the transportation vehicle 122. But the provider client device 116 may be any type of computing device as further explained below with reference to FIG. 13. Additionally, or alternatively, the provider client device 116 may be a subcomponent of a transportation vehicle. Regardless of its form, the provider client device 116 may include various sensors, such as a GPS locator, an inertial measurement unit, an accelerometer, a gyroscope, a magnetometer, and/or other sensors that the intelligent transportation routing system 104 can access to obtain information, such as GPS locations and other location information.

Relatedly, the term "transportation vehicle" refers to a vehicle that transports one or more persons for an intelligent transportation routing system, such as an airplane, boat, automobile, motorcycle, or other vehicle. This disclosure primarily describes transportation vehicles as automobiles, such as cars, mopeds, shuttles, or sport utility vehicles, but the intelligent transportation routing system 104 may use any other transportation vehicle.

Although this disclosure often describes a transportation vehicle as performing certain functions, the transportation vehicle includes an associated provider client device that often performs a corresponding function. For example, when the intelligent transportation routing system 104 sends a transportation-request notification to the transportation vehicle 122—or queries location information from the transportation vehicle 122—the intelligent transportation routing system 104 sends the transportation-request notification or location query to the provider client device 116.

As further shown in FIG. 1, the provider client device 116 includes a provider application 118. In some embodiments, the provider application 118 comprises a web browser, applet, or other software application (e.g., native application) available to the provider client device 116. In some instances, the intelligent transportation routing system 104 provides data packets including instructions that, when executed by the provider client device 116, create or otherwise integrate the provider application 118 within an application or webpage.

In some embodiments, the intelligent transportation routing system 104 communicates with the provider client device 116 through the provider application 118. In addition to those communications, the provider application 118 optionally includes computer-executable instructions that, when executed by the provider client device 116, cause the provider client device 116 to perform certain functions. For instance, the provider application 118 can cause the provider client device 116 to communicate with the intelligent transportation routing system 104 to send data representing GPS locations or receive a transportation-request notification or navigate to a pickup location to pick up a requestor.

As shown in FIG. 1, the intelligent transportation routing system 104 receives communications via the server(s) 102. In certain embodiments, the server(s) 102 comprise a content server. The server(s) 102 can also comprise a communication server or a web-hosting server. This disclosure describes additional details regarding the server(s) 102 below with respect to FIG. 13. Although not illustrated in FIG. 1, in some embodiments, the environment 100 may have a different arrangement of components and/or may have a different number or set of components altogether. For example, in some embodiments, the intelligent transportation routing system 104 and the provider client device 116 can communicate directly, bypassing the network 108.

In addition to communicating with the provider client device 116 to receive GPS locations, the intelligent transportation routing system 104 optionally stores data corresponding to each route traveled and each transportation request on a transportation routing database 106 accessed by the server(s) 102. Accordingly, the server(s) 102 may generate, store, receive, and transmit various types of data, including, but not limited to, GPS locations, map-matched locations, location information, price estimates, estimated times of arrival, pickup locations, dropoff locations, and other data stored in the transportation routing database 106. In some such embodiments, the intelligent transportation routing system 104 organizes and stores such data in the transportation routing database 106 by geographic area, requestor, and/or time period.

As suggested above, when training an artificial neural network, the intelligent transportation routing system 104 identifies both training GPS locations and training map-matched locations for a training route traveled by a client device associated with the transportation vehicle 122. As indicated by FIG. 1, the client device may be the requestor client device 110 and/or the provider client device 116. This disclosure uses the term "training" for training GPS locations, training map-matched locations, training routes, training route tiles, and other "training" objects to indicate that the intelligent transportation routing system 104 uses those objects to train an artificial neural network.

As used in this disclosure, the term "map-matched location" refers to a location on a digital map corresponding to a GPS location. For example, map-matched locations may correspond to locations along a road within a digital map that correspond to GPS locations received from a client device. In certain embodiments, the intelligent transportation routing system 104 estimates locations along roads of a digital map based on GPS locations. For instance, the intelligent transportation routing system 104 may use hidden Markov models, path-inference filter, or other existing map-matching processes to infer locations along a road within a digital map based on GPS locations. Additionally, the intelligent transportation routing system 104 may access digital maps from the transportation routing database 106 (or from a third-party server) on which to map-match the GPS locations, such as Open Street Maps or other available digital maps. As suggested above, the intelligent transportation routing system 104 may use a set of training map-matched locations and training GPS locations corresponding to a training route to train an artificial neural network.

After identifying training GPS locations and training map-matched locations for a training route, in certain embodiments, the intelligent transportation routing system 104 generates regions along the training route. As used in this disclosure, the term "region" refers to a geographical space that includes or surrounds portions of an estimated route. For example, in certain embodiments, a region includes a rectangular space that surrounds a portion of an estimated route based on GPS locations and/or map-matched locations. The rectangular space may be, for instance, a squared region measured in centimeters, inches, feet, meters, or some other measurement.

Figure 3A:
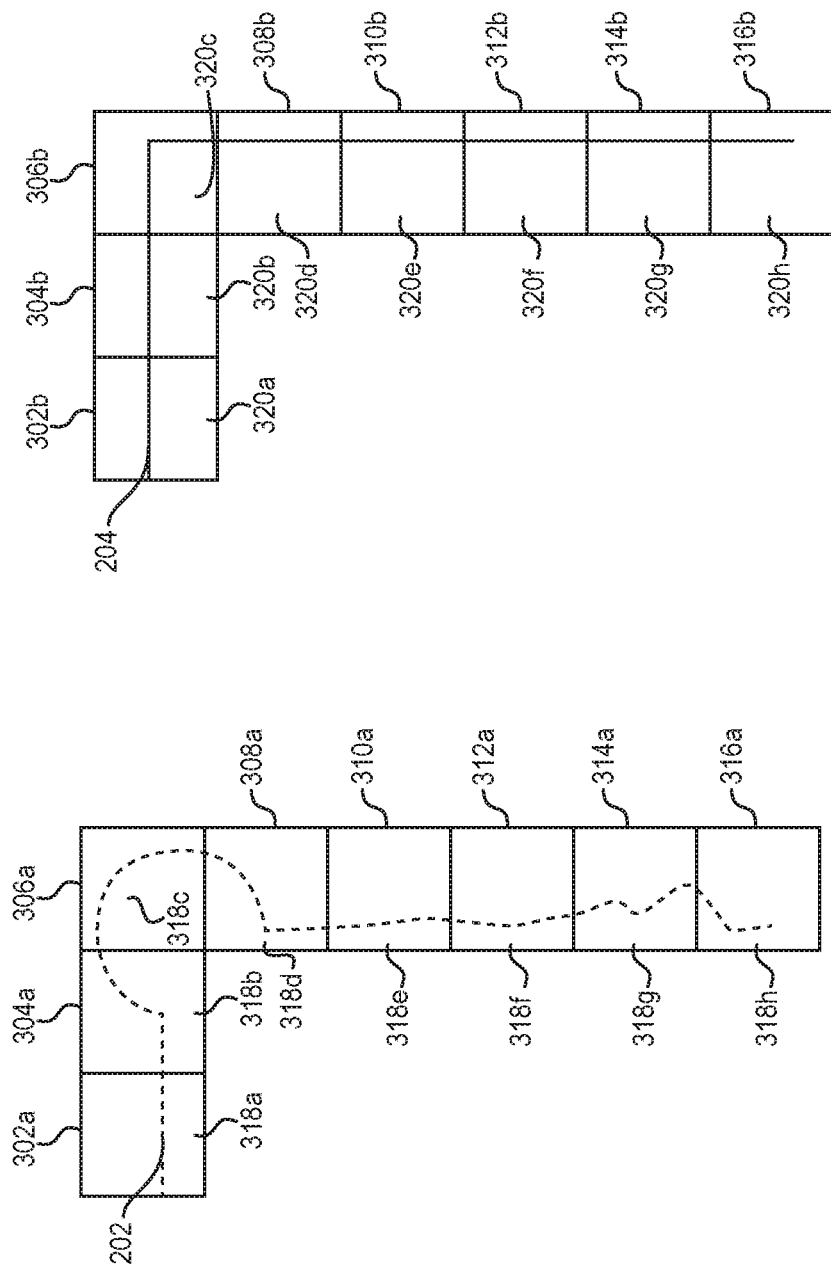

When the intelligent transportation routing system 104 generates regions, in some embodiments, a region includes a subset of training GPS locations and a subset of training map-matched locations. Based on the subset of training GPS locations and the subset of training map-matched locations, the intelligent transportation routing system 104 generates a training route tile for the region. FIG. 3A depicts examples of such regions.

As used in this disclosure, the term "route tile" refers to a digital representation of GPS locations and/or map-matched locations within a region along a route. A route tile may represent GPS locations and/or map-matched locations (for a region) in a single route tile or in multiple route tiles. For example, in certain embodiments, a route tile includes two image matrices. A first image matrix may include representations of a subset of GPS locations corresponding to a region. A second image matrix may include representations of a subset of map-matched locations corresponding to the region. FIG. 3B depicts examples of a route tile. As suggested above, in some embodiments, the intelligent transportation routing system 104 generates training route tiles corresponding to regions along a training route to train an artificial neural network.

In addition to generating a training route tile for a region, the intelligent transportation routing system 104 uses an artificial neural network to predict a route-accuracy metric for the region based on the training route tile. The term "route-accuracy metric" refers to an indicator of GPS locations or map-matched locations for a region. In particular, the term "route-accuracy metric" includes an indicator of accuracy, precision, or reliability of a subset of GPS locations or map-matched locations for a region. For example, the term "route-accuracy metric" includes an indicator of whether GPS locations or map-matched locations more accurately represent a route traveled by a client device.

A route-accuracy metric may take different forms. For example, in some implementations, a route-accuracy metric may be an accuracy classifier that indicates a noise level for a subset of GPS locations corresponding to a region along the route (e.g., whether the GPS locations are noisy or clean or whether the system should rely on the GPS locations or the map-matched locations). As another example, in some cases, a route-accuracy metric may be an indicator of the regional distance traveled by a client device within a region based on a route tile (e.g., a predicted regional distance as opposed to the distance of the route indicated by the GPS locations or the map-matched locations). Alternatively, a route-accuracy metric may be an estimated path traveled by the client device within a region along the route (e.g., a predicted path as opposed to the path indicated by the GPS locations or the map-matched locations).

Relatedly, the term "ground-truth-route-accuracy metric" refers to a route-accuracy metric based on empirical observation (or simulated observation) utilized to determine error of a predicted route accuracy metric. In particular, the term "ground-truth-route-accuracy metric" includes a route-accuracy metric that is provided to an artificial neural network to determine an error or loss of a predicted route-accuracy metric. For example, a ground-truth-route-accuracy metric may include an accurate (i.e. ground-truth) classification label, distance, or path for a particular region. In certain embodiments, the intelligent transportation routing system 104 compares a predicted route-accuracy metric to a ground-truth-route-accuracy metric for the same region. Based on a comparison between the ground-truth-route-accuracy metric and a predicted route-accuracy metric, the intelligent transportation routing system 104 adjusts parameters of the artificial neural network to reflect the ground-truth-route-accuracy metric. Such adjustments train the artificial neural network to improve the accuracy of its predicted route-accuracy metrics for training route tiles.

The term "artificial neural network" refers to a machine learning model that can be tuned (e.g., trained) based on training input to approximate unknown functions. In particular, the term "artificial neural network" can include a model of interconnected digital neurons that communicate and learn to approximate complex functions and generate outputs based on a plurality of inputs provided to the model. For instance, the term "artificial neural network" includes convolutional neural networks and fully convolutional neural networks. Artificial neural networks also include feed-forward neural networks or recurrent neural networks. An artificial neural network includes an algorithm that implements deep learning techniques, i.e., machine learning that utilizes a set of algorithms to attempt to model high-level abstractions in data.

In some embodiments, the intelligent transportation routing system 104 trains or uses a convolutional neural network as its artificial neural network. As used in this disclosure, the term "convolutional neural network" refers to an artificial neural network that uses one or more convolutional layers to analyze features extracted from an input. Additional detail regarding architecture of a convolutional neural network is provided below.

In addition to training the artificial neural network, in certain embodiments, the intelligent transportation routing system 104 uses the artificial neural network to analyze route tiles corresponding to a route traveled by a client device and to determine route-accuracy metrics for regions along the route. This disclosure describes the application process of a trained artificial neural network below.

Although FIG. 1 illustrates the intelligent transportation routing system 104 as part of the server(s) 102, in one or more embodiments, the intelligent transportation routing system 104 is implemented, in whole or in part, by other computing devices within the environment 100. For example, in one or more embodiments, the intelligent transportation routing system 104 is implemented as part of the requestor client device 110 (e.g., as part of the requestor application 112). Moreover, in some embodiments, the intelligent transportation routing system 104 is implemented as part of the provider client device 116 (e.g., as part of the provider application 118). Accordingly, the intelligent transportation routing system 104 can utilize the server(s) 140, the requestor client device 110, and the provider client device 116 to arrange train and implement the artificial neural network.

Figure 2C:
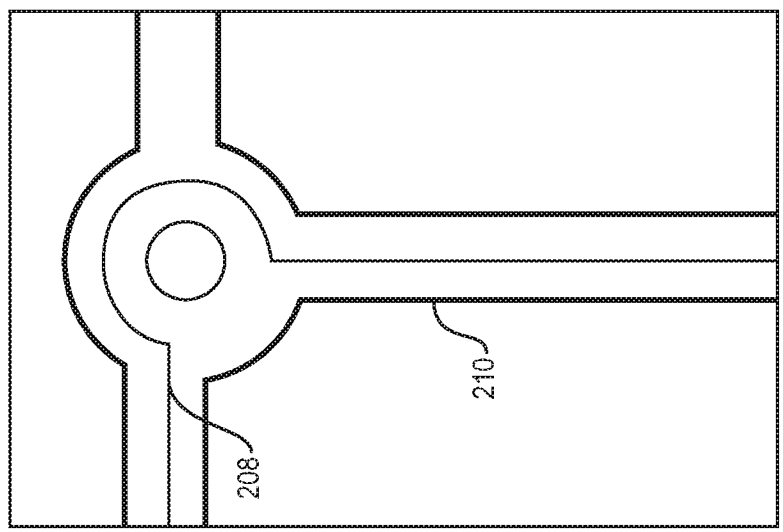
FIGS. 2A-2C illustrate GPS locations corresponding to a route, map-matched locations corresponding to the route, and a ground-truth representation of the route in accordance with one or more embodiments.
Figure 2B:
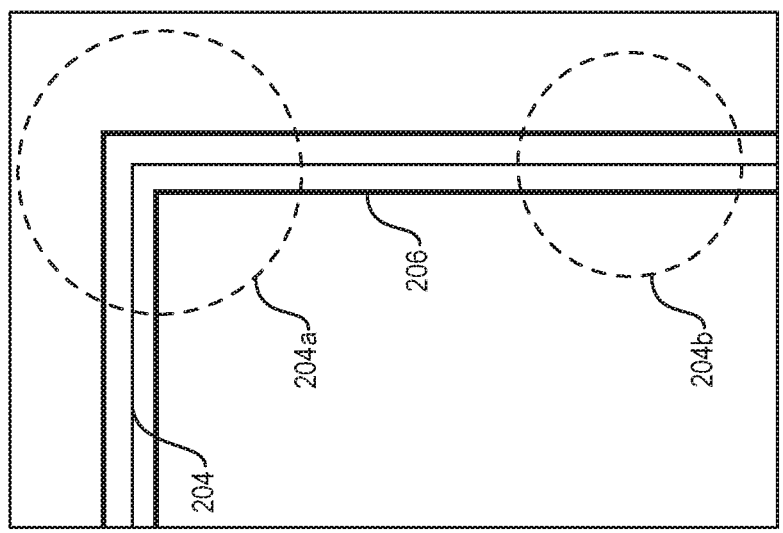
Figure 2A:
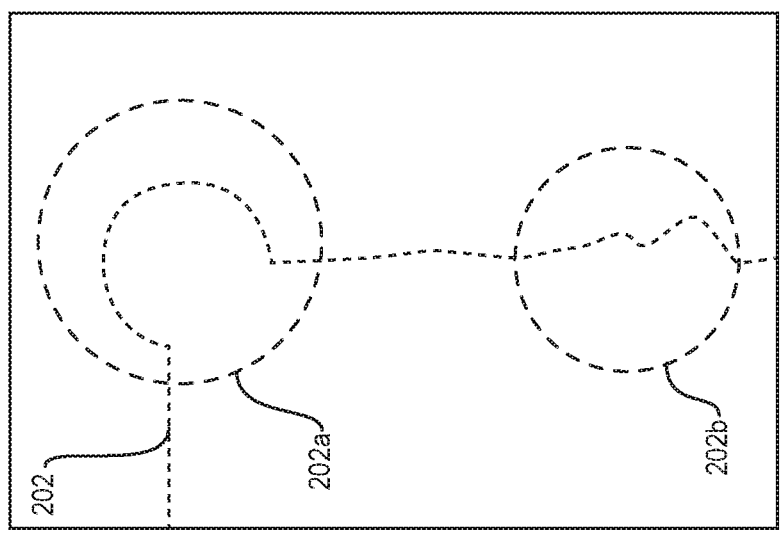

As noted above, the intelligent transportation routing system 104 identifies locations for a route traveled by a client device. FIGS. 2A-2C illustrate an example of such locations and a route—including GPS locations 202 corresponding to a route, map-matched locations 204 corresponding to the route, and a ground-truth representation 208 of the route. As FIGS. 2A-2C indicate, the GPS locations 202, the map-matched locations 204, and the ground-truth representation 208 each indicate different versions of a route traveled by a client device. The differences between the GPS locations 202 and the map-matched locations 204 reflect the inaccuracies of determining a route based on GPS or map-matching data. To eliminate some of these inaccuracies, in certain embodiments, the intelligent transportation routing system 104 determines whether GPS locations or map-matched locations more accurately represent the route traveled by a client device.

As shown in FIG. 2A, the intelligent transportation routing system 104 receives GPS data corresponding to the GPS locations 202 from a client device (e.g., the provider client device 116 and/or the requestor client device 110). In this particular embodiment, a subset of GPS locations 202a correspond to clean GPS data. The GPS data corresponding to the subset of GPS locations 202a may be clean because a GPS receiver for the client device transmits, propagates, and/or receives a GPS signal for the subset with relatively little distortion. By contrast, a subset of GPS locations 202b corresponds to noisy GPS data. The GPS data corresponding to the subset of GPS locations 202b may be noisy because the GPS receiver for the client device transmits, propagates, and/or receives a GPS signal for the subset with relatively high distortion. Because the underlying GPS data is noisy, the subset of GPS locations 202b does not accurately represent the locations of the client device along the route.

Although FIG. 2A depicts the GPS locations 202 as individual locations, FIG. 2B depicts the map-matched locations 204 as a contiguous path. By showing the map-matched locations 204 as a contiguous path, the map-matched locations 204 include interpolated straight lines between successive map-matched locations. In other embodiments, however, the map-matched locations 204 may be represented as individual locations.

As indicated by FIGS. 2A and 2B, the GPS locations 202 and the map-matched locations 204 indicate different estimated routes traveled by the client device. The map-Attorney matching process explains in part the different contours of these estimated routes. In the embodiment shown in FIGS. 2A and 2B, the intelligent transportation routing system 104 uses hidden Markov models to infer locations along a road 206 within a digital map from the GPS locations 202. Based on these inferences, the intelligent transportation routing system 104 "snaps" or adjusts the GPS locations 202 to the map-matched locations 204. As shown in FIG. 2B, the map-matched locations 204 closely track the road 206 within a digital map. For instance, subsets of map-matched locations 204a and 204b closely track different contours of the road 206.

As suggested above, certain map-matching processes rest on an assumption that the roads of a digital map accurately reflect current road locations. Accordingly, if a digital map's road accurately reflects conditions on the ground, map-matched locations may more accurately represent a route than corresponding GPS locations. By contrast, if a digital map's road does not accurately reflect conditions on the ground, the map-matched locations may not more accurately reflect the route than corresponding GPS locations.

In addition to the road 206 from a digital map depicted in FIG. 2B, FIG. 2C depicts a ground-truth road 210. The ground-truth road 210 represents the road upon which the transportation vehicle 122 associated with the client device actually traveled. As shown in FIGS. 2B, 2C, the road 206 corresponding to the map-matched locations 204 differs from the ground-truth road 210 in certain respects. The ground-truth representation 208 of the route tracks the contours of the ground-truth road 210. As noted above, in some embodiments, the intelligent transportation routing system 104 determines whether portions of the GPS locations 202 or portions of the map-matched locations 204 more accurately represent the ground-truth representation 208 of the route—that is, the route actually traveled by the client device.

For example, the intelligent transportation routing system 104 may compare the subsets of GPS locations 202a and 202b to the corresponding subsets of map-matched locations 204a and 204b, respectively, to determine which of the location subsets to use for a particular region. As shown in FIGS. 2A-2C, the subset of GPS locations 202a more accurately reflects the ground-truth representation 208 of the route than the corresponding subset of map-matched locations 204a. By contrast, the subset of GPS locations 202b more accurately reflects the ground-truth representation 208 of the route than the corresponding subset of map-matched locations 204b. This disclosure describes embodiments of the intelligent transportation routing system 104 that analyze such location subsets (and how to distinguish between them).

As suggested above, in some embodiments, the intelligent transportation routing system 104 analyzes location subsets according to region using route tiles. FIGS. 3A-3B depict the intelligent transportation routing system 104 both analyzing regions along a route traveled by a client device and generating route tiles corresponding to each region along the route. As shown in FIG. 3A, for example, the intelligent transportation routing system 104 segments a trace of the GPS locations 202 into regions 302a-316a. In this particular embodiment, the intelligent transportation routing system 104 segments the trace of the GPS locations 202 into squares. As shown in FIG. 3A, each of the regions 302a-316a represents an 1×1 square meter, where 1 represents a length in meters of one side of the region. In alternative embodiments, the intelligent transportation routing system 104 may use other shapes to represent regions and/or other measurements of the regions boundaries, such as using circular regions with a radius defined in miles.

As further shown in FIG. 3A, the intelligent transportation routing system 104 also segments a trace of the map-matched locations 204 into regions 302b-316b. The regions 302b-316b cover the same geographic areas as (and correspond to) the regions 302a-316a, respectively. Consequently, the regions 302a-316a are the same as the regions 302b-316b. For purposes of illustration, however, FIG. 3A depicts the regions 302a-316a and the regions 302b-316b separately. But a skilled artisan will recognize that when this disclosure refers to the region 302a, it likewise refers to the region 302b, and so on and so forth. As shown separately, however, the regions 302a-316a respectively include subsets of GPS locations 318a-318h (from among the GPS locations 202), and the regions 302b-316b respectively include subsets of map-matched locations 320a-320h (from among the map-matched locations 204).

By segmenting the GPS locations 202 and the map-matched locations 204 into the same geographic areas, the intelligent transportation routing system 104 facilitates comparison of the subsets of GPS locations 318a-318h and the subsets of map-matched locations 320a-320h. For example, in the regions 302a and 302b, the subset of GPS locations 318a and the subset of map-matched locations 320a each represent estimates of the route traveled by the client device. As described below, the intelligent transportation routing system 104 compares these location subsets using a route tile for the regions 302a and 302b.

FIG. 3B illustrates an example of a region that includes location subsets indicating different estimated routes. As shown in FIG. 3B, the subset of GPS locations 318c within the region 306a indicates a different estimated route than the subset of map-matched locations 320c within the region 306b. The subset of GPS locations 318c (shown in the region 306a) are based on relatively clean GPS data and more accurately represent the route for the shared region than the subset of map-matched locations 320c (shown in the region 306b).

After segmenting a trace of GPS locations into regions, in certain embodiments, the intelligent transportation routing system 104 generates routes tiles corresponding to each region along a route. As noted above, a route tile includes a digital representation of the GPS locations and/or map-matched locations for a region along a route. FIG. 3B depicts one such route tile. As shown, the intelligent transportation routing system 104 generates a route tile 324 that includes two image matrices—a first image matrix 322a and a second image matrix 322b. The first image matrix 322a includes representations of the subset of GPS locations 318c corresponding to the region 306a. The second image matrix 322b includes representations of the subset of map-matched locations 320c corresponding to the region 306b.

To facilitate creating the route tile 324, in some embodiments, the intelligent transportation routing system 104 estimates a first path of the client device within the region 306a based on the subset of GPS locations 318c. Similarly, the intelligent transportation routing system 104 estimates a second path of the client device within the region 306b based on the subset of map-matched locations 320c. The intelligent transportation routing system 104 generates pixels to represent both estimated paths in the first image matrix 322a and the second image matrix 322b of the route tile 324 as well as pixels to represent positions outside of the estimated paths.

As further shown in FIG. 3B, the first image matrix 322a includes a first set of pixels that represent the first estimated path of the client device within the region 306a. The first image matrix 322a also includes a second set of pixels that represent positions outside of the first estimated path. Similarly, the second image matrix 322b includes a third set of pixels that represent the second estimated path of the client device within the region 306b. The second image matrix 322b also includes a fourth set of pixels that represent positions outside of the second estimated path.

In the embodiment shown in FIG. 3B, the first and third sets of pixels have one numeric value (shown as ones) to depict an estimated path of the client device. By contrast, the second and fourth sets of pixels have another numeric value (shown as zeros) to depict positions outside an estimated path of the client device. Continuing the example from above using 1×1 square meters for each region, in certain embodiments, each pixel includes either (a) the number one to represent the presence of the client device within the region or (b) zero to represent the absence of the client device. The intelligent transportation routing system 104 generates each image matrix by segmenting an estimated path into 1×1 regions and representing the data in an m×m image matrix, where m=1/g and g represents pixel granularity in meters per pixel. Accordingly, the first image matrix 322a represents an m×m image matrix for the first estimated path according to the GPS locations 318c in the region 306a, and the second image matrix 322b represent an m×m image matrix for the second estimated path according to the subset of map-matched locations 320c in the region 306b. Together, the route tile 324 includes pixels with m×m×2 matrices. In certain embodiments, the intelligent transportation routing system 104 generates a route tile with m×m×2 matrices for each of the regions 302a-316a and 302b-316b.

Although FIG. 3B illustrates particular pixel values (e.g., 1 or 0), in certain embodiments, the pixels may include different values, such as different color values or byte images. Accordingly, in certain embodiments, image matrices may include a color representation of the path represented by the subset of GPS locations 318c and another color representation of the path represented by the subset of map-matched locations 320c.

Moreover, although FIG. 3B illustrates utilizing a first image matrix based on GPS locations and a second image matrix based on map-matched locations, in one or more embodiments, the intelligent transportation routing system 104 generates route tiles based on other data. For example, rather than utilizing map-matched locations to generate the second image matrix 322b, the intelligent transportation routing system 104 can utilize a different image (in addition to or in the alternative to map-matched locations). In particular, the intelligent transportation routing system 104 can utilize a satellite image (or full map information, such as center line, curb and gutter, building contours, traffic rules, etc.) to generate the second image matrix 322b. To illustrate, the intelligent transportation routing system 104 can segment a satellite image into the regions 302a-316a and generate a route tile based on the pixels of the satellite image that corresponds to each of the regions 302a-316a. Specifically, the intelligent transportation routing system 104 can generate a second image matrix for each region based on the pixels of the satellite image that correspond to the region. The intelligent transportation routing system 104 can combine the second image matrix reflecting the satellite image pixels for the region with the first image matrix reflecting the subset of GPs locations for the region to generate a route tile.

Figure 4:
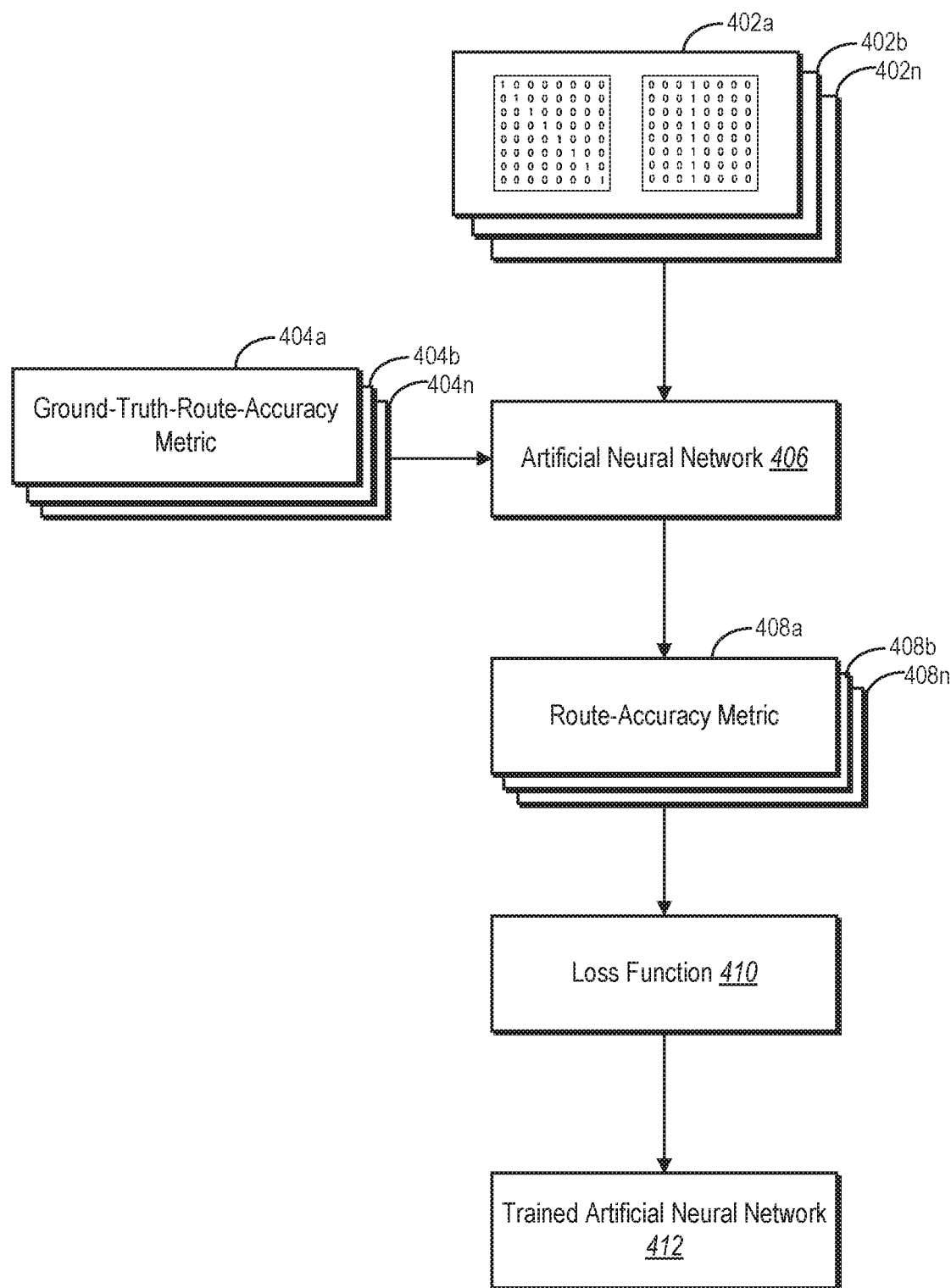
FIG. 4 illustrates a sequence-flow diagram of an intelligent transportation routing system training an artificial neural network to use training route tiles to predict route-accuracy metrics for regions along a training route traveled by a client device in accordance with one or more embodiments.

Regardless of the format of a route tile, in some embodiments, the intelligent transportation routing system 104 generates training route tiles for each region along a route based on the region's respective subset of training GPS locations and subset of training map-matched locations. Accordingly, the training route tiles may include image matrices with pixel sets representing an estimated path according to a subset of training GPS locations and a subset of training map-matched locations. Consistent with the disclosure above, the intelligent transportation routing system 104 generates such training route tiles using the methods described above. FIG. 4 illustrates the intelligent transportation routing system 104 training an artificial neural network to use the training route tiles to predict route-accuracy metrics for regions along a training route. When describing the training process, this disclosure uses the terms "region" and "training region" interchangeably.

As an overview of the training process shown in FIG. 4, the intelligent transportation routing system 104 iteratively inputs training route tiles 402a-402n and corresponding ground-truth-route-accuracy metrics 404a-404n into an artificial neural network 406. The intelligent transportation routing system 104 uses the artificial neural network 406 to predict route-accuracy metrics 408a-408n (one by one) based on the training route tiles 402a-402n. The artificial neural network 406 applies a loss function 410 to determine a calculated loss between the predicted route-accuracy metrics 408a-408n and the ground-truth-route-accuracy metrics 404a-404n, respectively. Based on the calculated loss in each iteration, the intelligent transportation routing system 104 adjusts parameters of the artificial neural network 406 to ultimately generate a trained artificial neural network 412.

As part of each iteration, the intelligent transportation routing system 104 inputs the training route tiles 402a-402n (e.g., one training route tile at a time). Each of the training route tiles 402a-402n respectively corresponds to the ground-truth-route-accuracy metrics 404a-404n. In certain embodiments, the intelligent transportation routing system 104 inputs a training route tile together with a corresponding ground-truth-route-accuracy metric. For example, in one iteration, the intelligent transportation routing system 104 inputs the training route tile 402a and the ground-truth-route-accuracy metric 404a into the artificial neural network 406. By cycling through multiple iterations, the intelligent transportation routing system 104 uses the ground-truth-route-accuracy metrics 404a-404n as a label for the training route tiles 402a-402n to train the artificial neural network 406 to accurately predict route-accuracy metrics.

As suggested above, in certain embodiments, the ground-truth-route-accuracy metrics 404a-404n each indicate either a subset of training GPS locations or a subset of training map-matched locations for a given region. In particular, the ground-truth-route-accuracy metrics 404a-404n indicate whether the subset of training GPS locations or the subset of training map-matched locations are more accurate for a given region reflected in a corresponding training route tile. For example, in some embodiments, the ground-truth-route-accuracy metrics 404a-404n each indicate a noise level for a subset of training GPS locations for a given region. In some such implementations, the ground-truth-route-accuracy metrics 404a-404n comprise accuracy classifiers indicating whether a noise level for a subset of training GPS locations exceeds or falls below a GPS-noise threshold. Such an accuracy classifier may denote (i) a number one to indicate that a subset of training GPS locations is based on noisy GPS data or (ii) a zero to indicate that the subset of training GPS locations is based on clean GPS data.

After inputting a training route tile and a ground-truth-route-accuracy metric, the intelligent transportation routing system 104 uses the artificial neural network 406 to predict a route-accuracy metric for the training route tile. Through running multiple iterations, the artificial neural network 406 predicts each of the route-accuracy metrics 408a-408n for the training route tiles 402a-402n, respectively.

To facilitate comparison, the route-accuracy metrics 408a-408n take the same form as the ground-truth-route-accuracy metrics 404a-404n. For example, in some embodiments, the route-accuracy metric 408a is a predicted accuracy classifier for the training route tile 402a indicating a predicted noise level of a subset of training GPS locations (e.g., noisy or clean). In such embodiments, the ground-truth-route-accuracy metric 404a is similarly an accuracy classifier for the training route tile 402a indicating the actual classification (e.g., noisy or clean) of the subset of training GPS locations. Both the route-accuracy metrics 408b-408n and the ground-truth-route-accuracy metrics 404b-404n likewise take the same format.

As noted above, upon predicting a route-accuracy metric for a training route tile, the intelligent transportation routing system 104 applies a loss function 410 to determine a calculated loss. In particular, the loss function 410 determines a difference between the ground-truth-route-accuracy metrics 404a-404n and the predicted route-accuracy metrics 408a-408n, respectively. For example, in an iteration of certain embodiments, the intelligent transportation routing system 104 applies a cross-entropy-loss function to compare the route-accuracy metric 408a to the ground-truth-route-accuracy metric 404a. In such embodiments, the loss function 410 determines cross entropy loss between the route-accuracy metric 408a and the ground-truth-route-accuracy metric 404a.

As further shown in FIG. 4, the intelligent transportation routing system 104 uses the calculated loss from the loss function 410 to train the artificial neural network 406 to more accurately predict route-accuracy metrics (e.g., accuracy classifiers indicating noise levels). In particular, the intelligent transportation routing system 104 provides the calculated loss to the artificial neural network 406 in each iteration. The intelligent transportation routing system 104 then adjusts parameters of the artificial neural network 406 to minimize the calculated loss and more accurately reflect the ground-truth-route-accuracy metric for a given iteration. Through multiple iterations, the intelligent transportation routing system 104 uses the artificial neural network 406 to repeatedly predict route-accuracy metrics for training route tiles and adjusts the parameters of the artificial neural network 406 to generate the trained artificial neural network 412. In some such embodiments, the intelligent transportation routing system 104 trains the artificial neural network 406 using thousands (or millions) of training route tiles in discrete batches (e.g., 1.5 million training route tiles in batches of 250).

The disclosure above describes FIG. 4 in terms of accuracy classifiers for the ground-truth-route-accuracy metrics 404a-404n and the route-accuracy metrics 408a-408n. In alternative embodiments, the intelligent transportation routing system 104 uses different route-accuracy metrics to train the artificial neural network 406. For example, in certain embodiments, the ground-truth-route-accuracy metric and the route-accuracy metric respectively comprise a regional distance traveled by a client device within a region along a route and a predicted regional distance traveled by the client device within the region along the route. Alternatively, the ground-truth-route-accuracy metric and the route-accuracy metric respectively comprise a path traveled by a client device within a region along the route and a predicted path traveled by the client device within the region along the route. In this manner, the intelligent transportation routing system 104 can train the artificial neural network 406 to predict an actual distance or actual path traveled by the client device.

As indicated above, in some such embodiments, the artificial neural network 406 comprises a convolutional neural network. Alternatively, the intelligent transportation routing system 104 uses a feedforward neural network to solve a regression problem. By solving a regression problem, the feedforward neural network can, in certain embodiments, predict regional distances or estimated paths traveled by a client device based on training route tiles.

Figure 5:
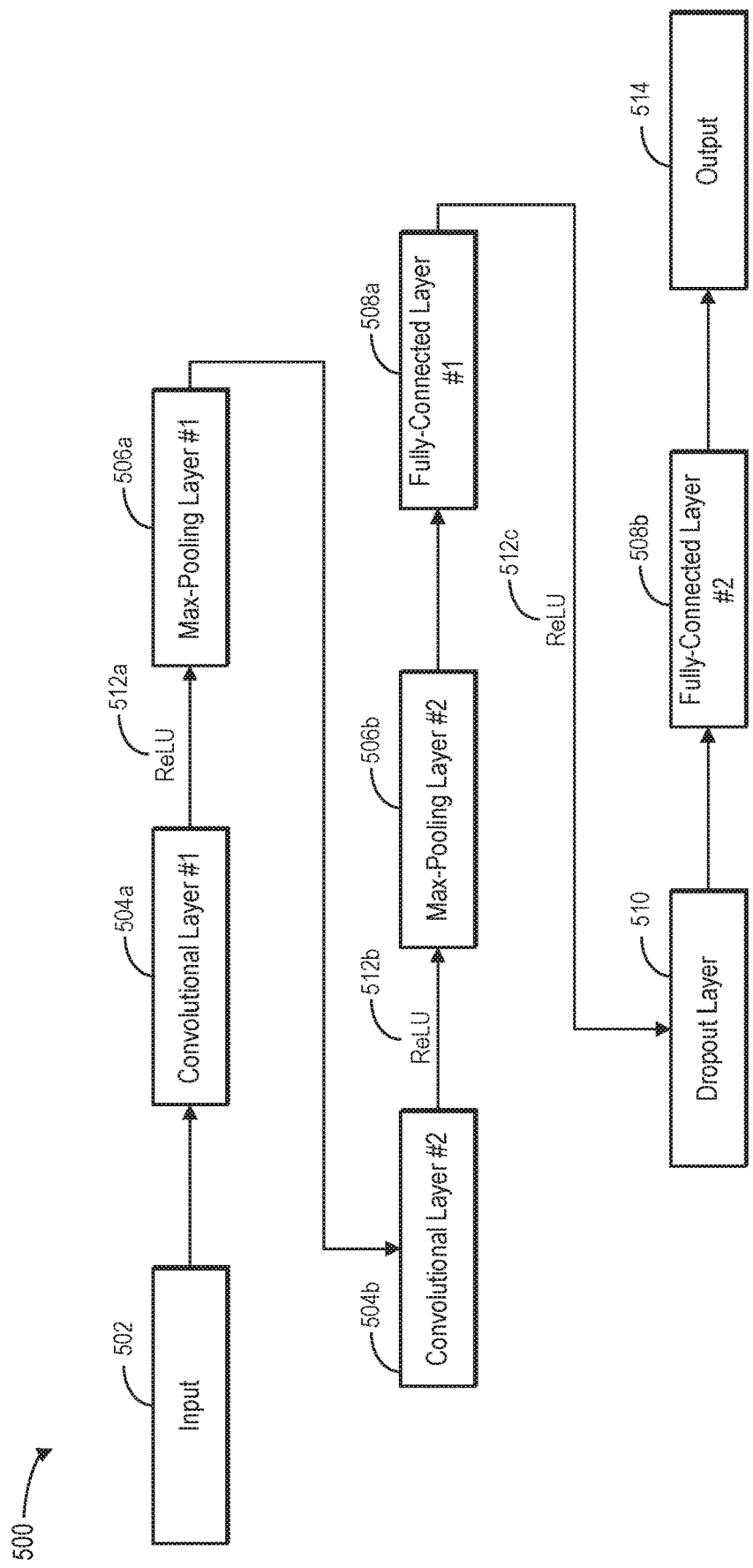
FIG. 5 illustrates layers of a convolutional neural network for analyzing route tiles in accordance with one or more embodiments.

FIG. 5 illustrates one exemplary convolutional neural network in accordance with one or more embodiments of the intelligent transportation routing system 104. In particular, FIG. 5 shows a convolutional neural network 500 that includes convolutional layers, max-pooling layers, fully-connected layers, and a dropout layer. The convolutional neural network 500 includes such layers in the following order: a first convolutional layer 504a, a first max-pooling layer 506a, a second convolutional layer 504b, a second max-pooling layer 506b, a first fully-connected layer 508a, a dropout layer 510, and a second fully-connected layer 508b.

As further shown in FIG. 5, the first convolutional layer 504a receives an input 502 from the intelligent transportation routing system 104. When training the convolutional neural network 500, the input 502 comprises a training route tile and a corresponding ground-truth-route-accuracy metric in each iteration. By contrast, when applying a trained version of the convolutional neural network 500 to determine route-accuracy metrics, the input 502 comprises a route tile. Alternatively, a trained convolutional neural network 500 may receive a route tile together with a ground-truth-route-accuracy metric having a null value as the input 502. In applying the trained artificial neural network (e.g., with an input route tile and null label) no update is performed on the parameters within the artificial neural network (because the trained artificial neural network is not being trained based on a ground-truth value).

In addition to the input 502, the convolutional neural network 500 includes rectified linear units ("ReLUs") 512a, 512b, and 512c in between certain layers. As shown in FIG. 5, the convolutional neural network 500 uses the ReLU 512a to apply a rectifier to an output of the first convolutional layer 504a, the ReLU 512b to apply a rectifier to the output of the second convolutional layer 504b, and the ReLU 512c to apply a rectifier to the output of the first fully-connected layer 508a.

As shown at the end of the convolutional neural network 500, the second fully-connected layer 508b generates an output 514. When training the convolutional neural network 500, the output 514 for each iteration comprises a predicted route-accuracy metric for the training route tile input by the intelligent transportation routing system 104. By contrast, when applying a trained version of the convolutional neural network 500, the output 514 for each iteration comprises a determined route-accuracy metric for the route tile input by the intelligent transportation routing system 104.

Figure 6:
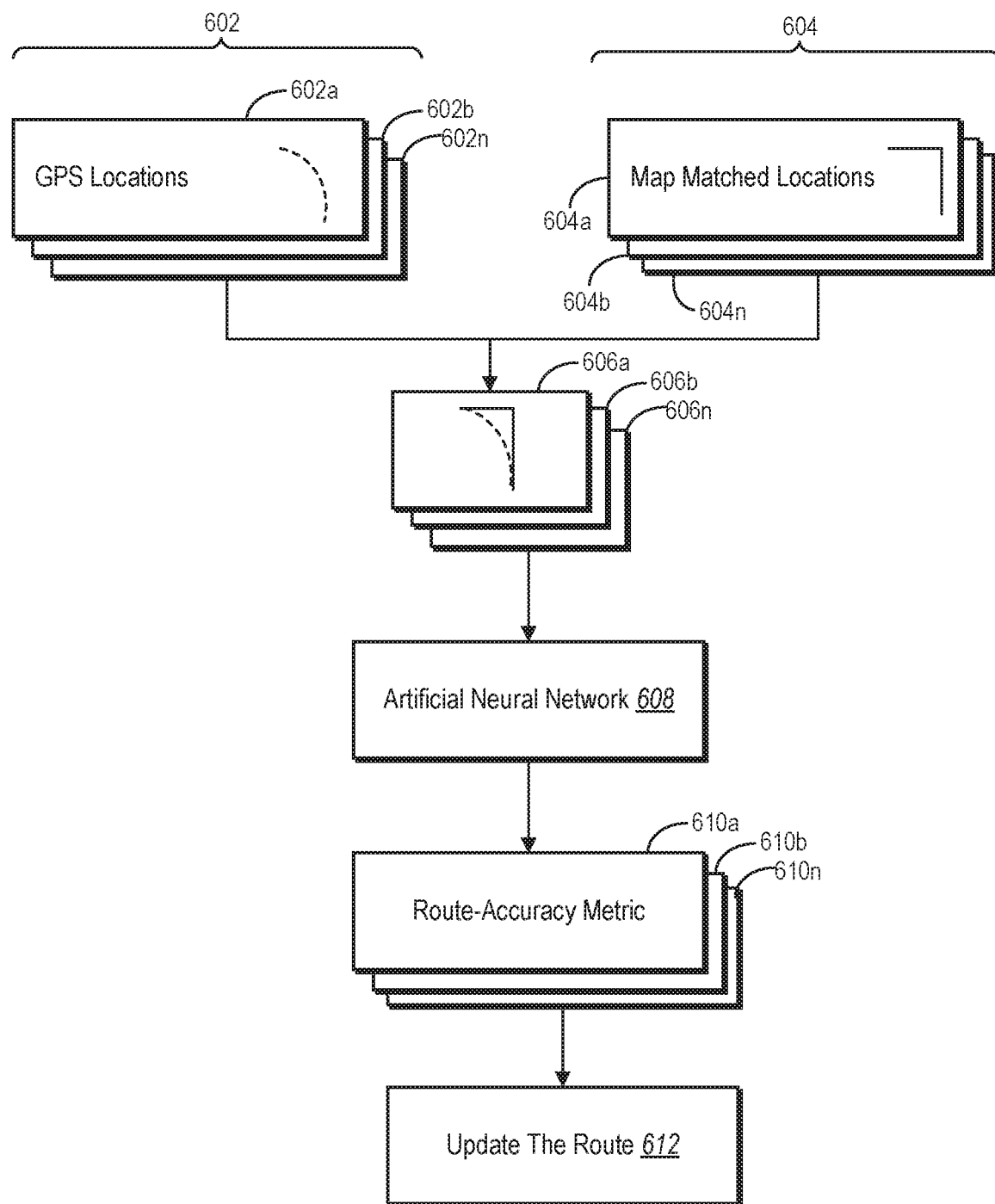
FIG. 6 illustrates a sequence-flow diagram of an intelligent transportation routing system using an artificial neural network to determine route-accuracy metrics for regions along a route traveled by a client device in accordance with one or more embodiments.

In addition to training an artificial neural network, the intelligent transportation routing system 104 also applies a trained artificial neural network to route tiles to determine route-accuracy metrics. FIG. 6 illustrates an embodiment of the intelligent transportation routing system 104 applying a trained artificial neural network. As an overview of FIG. 6, the intelligent transportation routing system 104 identifies GPS locations 602 and map-matched locations 604—both corresponding to a route traveled by a client device associated with a transportation vehicle. The intelligent transportation routing system 104 then generates (i) regions along the route and (ii) route tiles 606a-606n for the regions based on subsets of GPS locations 602a-602n and subsets of map-matched locations 604a-604n. The intelligent transportation routing system 104 subsequently uses the artificial neural network 608 to determine route-accuracy metrics 610a-610n based on the route tiles 606a-606n. Having determined the route-accuracy metrics 610a-610n, the intelligent transportation routing system 104 performs the act 612 of updating the route (e.g., by determining a distance of the route).

When identifying the GPS locations 602, in certain embodiments, the intelligent transportation routing system 104 receives the GPS locations 602 detected by a client device traveling along a route. For example, in some implementations, a GPS receiver of the client device receives GPS data representing the GPS locations 602. The client device then transmits the GPS data representing the GPS locations 602 to the intelligent transportation routing system 104.

After receiving the GPS locations 602, in certain embodiments, the intelligent transportation routing system 104 uses a map-matching process to infer locations along a road within a digital map based on the GPS locations 602. By inferring locations along the road, the intelligent transportation routing system 104 generates the map-matched locations 604. In some embodiments, the intelligent transportation routing system 104 communicates with third-party server(s) (not shown) that perform a map-matching process to adjust the GPS locations 602 to create the map-matched locations 604.

Having identified the GPS locations 602 and the map-matched locations 604, the intelligent transportation routing system 104 generates regions along the route. Consistent with the disclosure above, in certain implementations, the intelligent transportation routing system 104 segments a trace of the GPS locations 602 into regions. The intelligent transportation routing system 104 likewise segments a trace of the map-matched locations 604 into the same regions. Accordingly, each of the regions along the route includes one of the subsets of GPS locations 602a-602n and one of the subsets of map-matched locations 604a-604n, respectively.

In addition to creating regions of location subsets, the intelligent transportation routing system 104 generates the route tiles 606a-606n. As an example, in certain embodiments, the route tile 606a includes (i) a representation of the subset of GPS locations 602a and (ii) a representation of the subset of map-matched locations 604a. Each of the route tiles 606b-606n similarly include (i) a representation of one of the subsets of GPS locations 602b-602n, respectively, and (ii) a representation of one of the subsets of map-matched locations 604b-602n, respectively.

Upon receiving a route tile, the artificial neural network 608 determines a route-accuracy metric for each region. In some such embodiments, the artificial neural network 608 determines a route-accuracy metric for the route tile corresponding to each region (e.g., the route tiles 606a-606n). The route-accuracy metrics 610a-610n may take the form of any of the route-accuracy metrics described above, including those described with reference to FIG. 4—except that the route tiles would not be used for training for the embodiments depicted in FIG. 6. For example, in some embodiments, the route-accuracy metric 610a is an accuracy classifier for the route tile 606a indicating a noise level of the subset of GPS locations 602a. Additionally, or alternatively, in certain embodiments, the route-accuracy metric 610a indicates either the subset of GPS locations 602a or the subset of map-matched locations 604a. In some such embodiments, the route-accuracy metric 610a indicates which of the subset of GPS locations 602a or the subset of map-matched locations 604a more accurately represents the route traveled by the client device.

Based on a route-accuracy metric, in certain embodiments, the intelligent transportation routing system 104 selects one of the subset of GPS locations 602a or the subset of map-matched locations 604a. The intelligent transportation routing system 104 makes a similar selection of one of the subset of GPS locations or one of the subset of map-matched locations for each region corresponding to the route tiles 606b-606n. Such a route-accuracy metric may include, but is not limited to, an accuracy classifier for a route tile indicating a noise level of the subset of GPS locations, an indication of either the subset of GPS locations or the subset of map-matched locations, or an indication of which of the subset of GPS locations or the subset of map-matched locations more accurately represents the route. For example, in some embodiments, the intelligent transportation routing system 104 selects the subset of GPS locations 602a for a corresponding region based on an accuracy classifier for the route tile 606a indicating that a noise level of the subset of GPS locations 602a falls below a GPS-noise threshold. As another example, in certain implementations, the intelligent transportation routing system 104 selects the subset of map-matched locations 604a for a corresponding region based on an accuracy classifier for the route tile 606a indicating that a noise level of the subset of GPS locations 602a exceeds a GPS-noise threshold. Additional examples of selecting a subset of GPS locations or a subset of map-matched locations are provided below within the context of updating the route.

As further shown in FIG. 6, the intelligent transportation routing system 104 performs the act 612 of updating the route. In some such embodiments, the intelligent transportation routing system 104 updates the route to include a selected subset of GPS locations or a subset of map-matched locations for each region. The intelligent transportation routing system 104 can utilize the route-accuracy metrics 408a-408n to update the route in several ways. For instance, in certain embodiments, the intelligent transportation routing system 104 determines a distance of the route traveled by the client device based on the route-accuracy metrics 610a-610n. In some such embodiments, the intelligent transportation routing system 104 uses route-accuracy metrics to determine (for each region) whether to indicate (i) a subset of GPS locations corresponding to the region or (ii) a subset of map-matched locations corresponding to the region. Upon making such a determination, the intelligent transportation routing system 104 uses the indicated location subset when determining a distance of the route.

For example, in certain implementations, the intelligent transportation routing system 104 determines individual distances between each of GPS locations within a subset of GPS locations or between individual distances between each of the map-matched locations within a subset of map-matched locations. The intelligent transportation routing system 104 then sums the individual distances to determine a regional distance traveled by the client device within a given region.

In some such embodiments, the route-accuracy metric 610a comprises an accuracy classifier indicating that a noise level of the subset of GPS locations 602a falls below a GPS-noise threshold. When a noise level falls below a GPS-noise threshold, in certain implementations, the intelligent transportation routing system 104 selects the corresponding subset of GPS locations to determine a regional distance for the region. By contrast, when a noise level exceeds the GPS-noise threshold, in some embodiments, the intelligent transportation routing system 104 selects the corresponding subset of map-matched locations to determine a regional distance for the region. Because the noise level of the subset of GPS locations 602a falls below a GPS-noise threshold in the example above, the intelligent transportation routing system 104 determines a regional distance traveled by the client device within the region (corresponding to the route tile 606a) based on the subset of GPS locations 602a. The intelligent transportation routing system 104 may similarly determine (for each remaining region along the route) whether to indicate one of the subsets of GPS locations 602b-602n or one of the subsets of map-matched locations 604b-604n. After making such determinations, the intelligent transportation routing system 104 sums up the regional distance for each region along the route to determine a distance of the route.

Alternatively, in certain embodiments, a route-accuracy metric comprises a regional distance traveled by the client device within the region corresponding to a route tile. Take the route-accuracy metric 610a again for example. In some such embodiments, the intelligent transportation routing system 104 may train the artificial neural network 608 to determine the regional distance traveled by the client device within the region corresponding to the route tile 606a. After determining the regional distance for each remaining region along the route, the intelligent transportation routing system 104 sums up the regional distance for each region to determine a distance of the route.

In addition (or in the alternative) to determining distance, in certain embodiments, the intelligent transportation routing system 104 determines a location of the client device based on one of the route-accuracy metrics 610a-610n. In some such embodiments, the intelligent transportation routing system 104 uses the route-accuracy metric 610b to determine (for the region corresponding to the route tile 606b) whether to indicate (i) the subset of GPS locations 602b corresponding to the region or (ii) the subset of map-matched locations 604b corresponding to the region. The region corresponding to the route tile 606b may be, for example, a last region along the route. Upon determining which location subset to use for the corresponding region, the intelligent transportation routing system 104 estimates a path traveled within the region to determine a location of the client device. Alternatively, the intelligent transportation routing system 104 identifies an individual GPS location from the subset of GPS locations 602b to determine a location of the client device within the corresponding region at a given time. The intelligent transportation routing system 104 may likewise identify an individual map-matched location from the subset of map-matched locations 604b to determine a location of the client device. Although the foregoing examples use the route-accuracy metric 610b and the route tile 606b as an example, the intelligent transportation routing system 104 may similarly determine a location of the client device based on any one of the route-accuracy metrics 610a-610n and the route tiles 606a-606n.

Alternatively, in certain embodiments, the route-accuracy metric 610b comprises an estimated path traveled by the client device within the region corresponding to the route tile 606b. In some such embodiments, the intelligent transportation routing system 104 may train the artificial neural network 608 to determine the estimated path traveled by the client device within the region corresponding to the route tile 606b. After determining the estimated path, the intelligent transportation routing system 104 identifies a location of the client device within the corresponding region at a given time.

In addition (or in the alternative) to determining a client device's location, in some embodiments, the intelligent transportation routing system 104 uses the route-accuracy metrics 610a-610n to modify digital maps to more accurately reflect location data. For example, in certain embodiments, the intelligent transportation routing system 104 may determine that route-accuracy metrics for route tiles corresponding to a given region indicate inaccuracies in underlying digital maps. The route tiles for the given region may come from multiple routes traveled by different client devices within the region.

To illustrate, in some such embodiments, the intelligent transportation routing system 104 utilizes a threshold before modifying a digital map. For example, the intelligent transportation routing system 104 determines that a number of route-accuracy metrics for a particular region indicate GPS locations are more accurate than map-matched locations. If the number of route-accuracy metrics satisfies the threshold, the intelligent transportation routing system 104 can modify the underlying map based on detected GPS locations.

Similarly, the intelligent transportation routing system 104 may determine that route-accuracy metrics for route tiles for a region indicate (i) a threshold number of subsets of GPS locations corresponding to a region are relatively clean (e.g., based on a GPS-noise threshold) and (ii) the subset of GPS locations corresponding to the region indicate a path that differs from a map-matched road within a digital map. Based on this determination, the intelligent transportation routing system 104 can modify the underlying digital map.

Figure 9B:
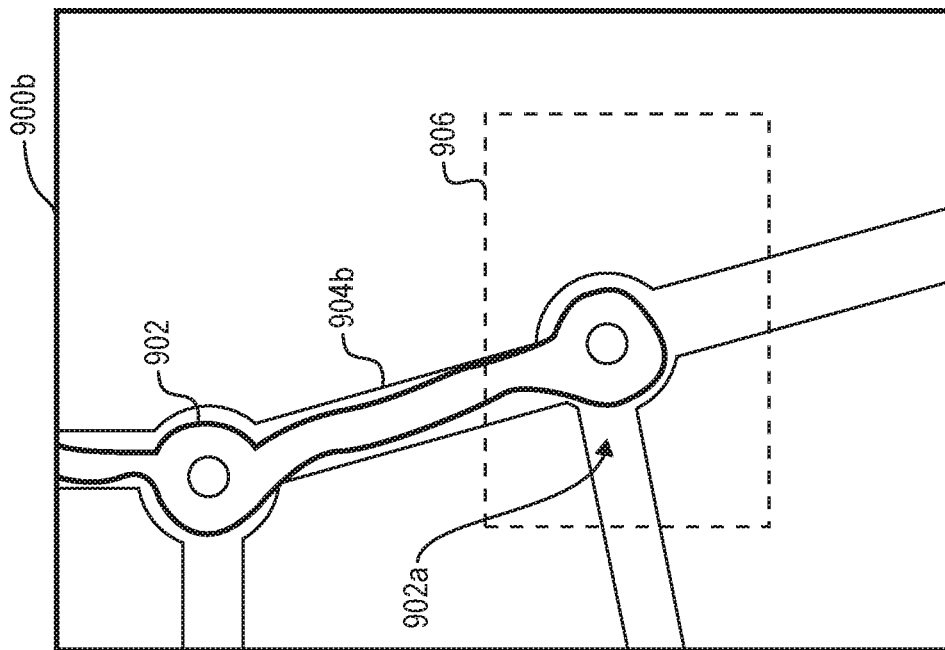
FIGS. 9A-9B illustrate an adjustment of a digital map for a route in accordance with one or more embodiments.
Figure 9A:
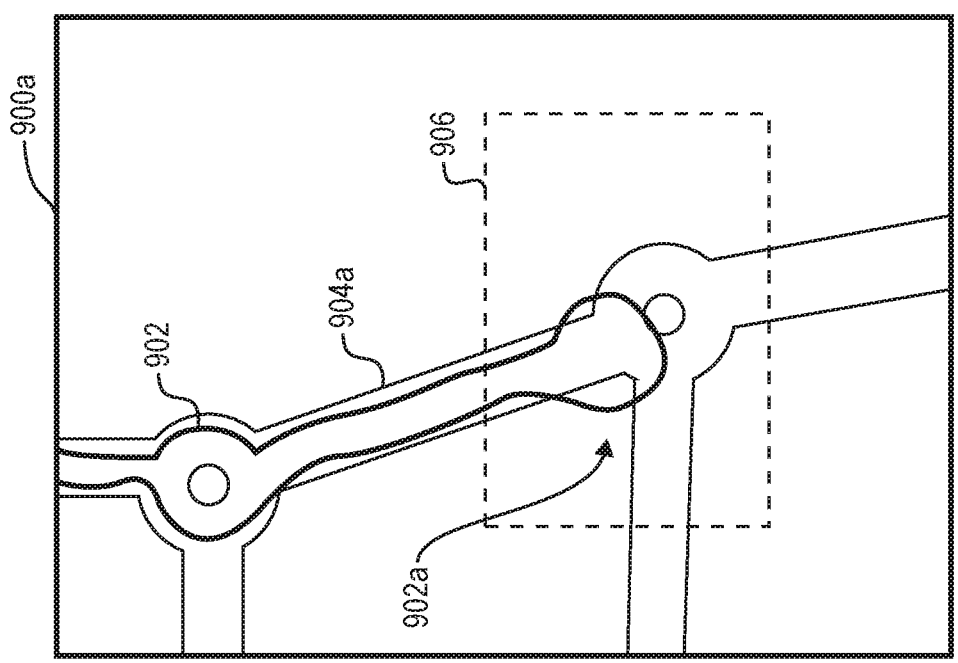

As just mentioned, in certain embodiments, the intelligent transportation routing system 104 adjusts the digital map for the region to correspond to a subset of GPS locations. For example, the intelligent transportation routing system 104 may adjust a road's contour within the digital map to correspond to a contour indicated by the subsets of GPS locations corresponding to the region. Alternatively, the intelligent transportation routing system 104 may alter a location of a road within the digital map to correspond to a road indicated by the subsets of GPS locations (e.g., by removing the road within the digital map and creating a new road based on the subset of GPS locations corresponding to the region). As discussed further below, FIGS. 9A-9B provide an example of adjusting a digital map.

In addition to training and utilizing an artificial neural network, in certain embodiments, the intelligent transportation routing system 104 synthesizes data to train the artificial neural network. Indeed, as mentioned above, in some embodiments, the intelligent transportation routing system 104 can utilize millions of training route tiles to generate a trained artificial neural network. To reduce the time and expense associated with obtaining training data (e.g., ground-truth route accuracy metrics and training tiles), in one or more embodiments, the intelligent transportation routing system 104 generates synthetic training data.

Figure 7:
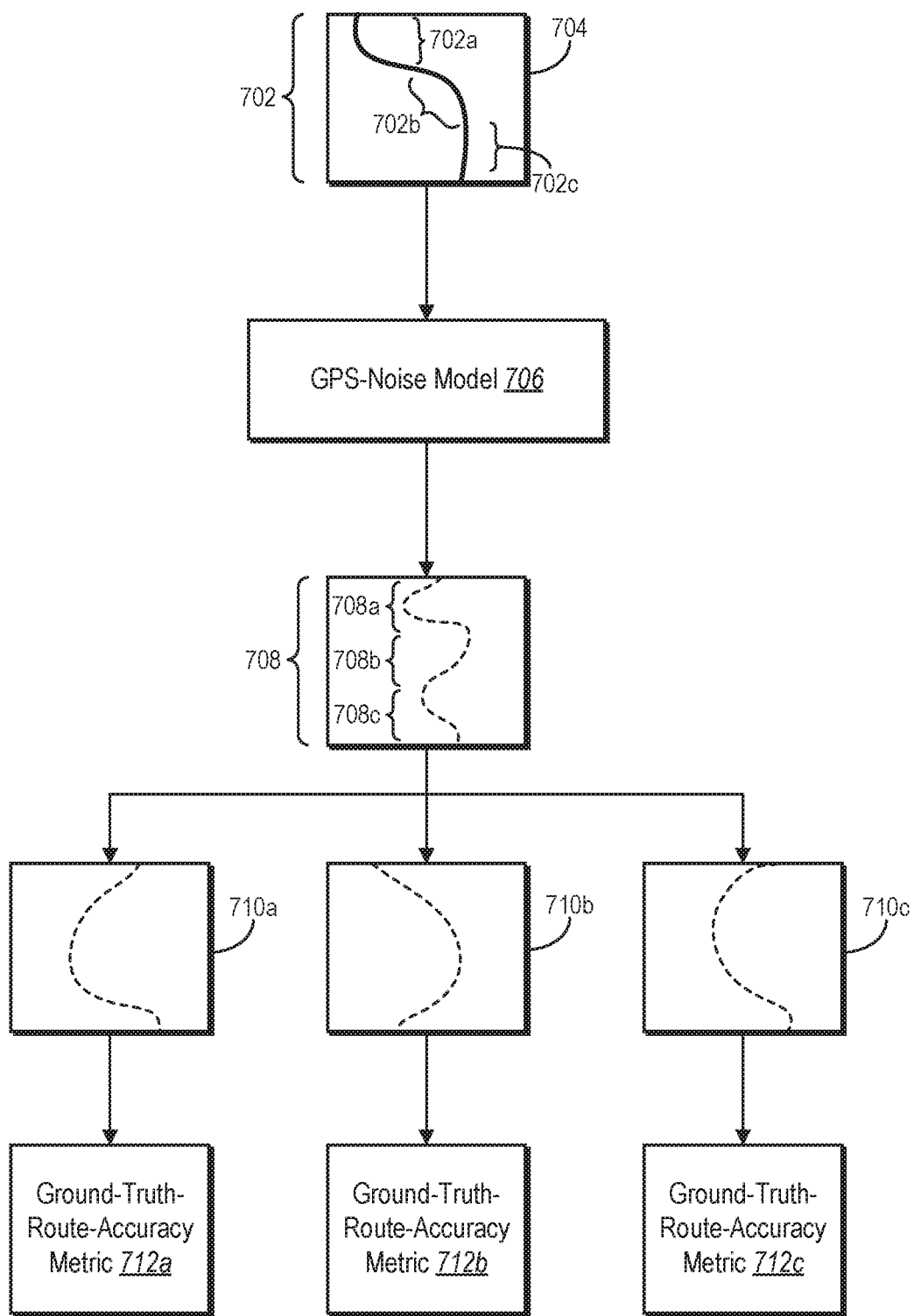
FIG. 7 illustrates a sequence-flow diagram of an intelligent transportation routing system generating training route tiles and ground-truth-route-accuracy metrics based on simulated route locations and simulated training GPS locations in accordance with one or more embodiments.

In particular, as noted above, the intelligent transportation routing system 104 simulates route locations for a training route and transforms the simulated route locations into simulated training GPS locations. By simulating the training GPS locations along a training route, the intelligent transportation routing system can generate and use synthetic route tiles as training route tiles. FIG. 7 provides an example of the intelligent transportation routing system 104 generating training route tiles and ground-truth-route-accuracy metrics based on simulated route locations and simulated training GPS locations.

As shown in FIG. 7, the intelligent transportation routing system 104 simulates route locations 702 for a training route 704 based on standard-traveling patterns. The training route 704 tracks simulated locations along a road within a road network, including subsets of route locations 702a, 702b, and 702c. The road network may be based on roads within a digital map of a real location or on roads within a virtual location generated by a computing device. Regardless of the basis of the road network, in some embodiments, the intelligent transportation routing system 104 generates a road network comprising roads with various turns and slight curves ranging from 0° to 180°. To simulate the route locations 702 within the road network, the intelligent transportation routing system 104 generates route locations based on, for example, standard driving speeds, acceleration at intersections, and stops at traffic lights or stops signs.

After simulating the route locations 702 for the training route 704, the intelligent transportation routing system 104 transforms the simulated route locations 702 into simulated training GPS locations 708 using a GPS-noise model 706. As indicated by FIG. 7, the simulated training GPS locations include subsets of simulated training GPS locations 708a, 708b, and 708c. Consistent with the disclosure above, each of the subsets of simulated training GPS locations 708a, 708b, and 708c correspond to different regions of the training route 704.

In certain embodiments, the intelligent transportation routing system 104 transforms a simulated route location (g) into a simulated training GPS location (ĝ) by using a GPS-noise model that simulates GPS noise as a stochastic process. As shown below, equation 1 represents one such GPS-noise model with a mean-reverting location and velocity terms:

$$\hat{g} = g + f$$

$$dF = \begin{bmatrix} -a & 0 & 1 & 0 \\ 0 & -a & 0 & 1 \\ 0 & 0 & -b & 0 \\ 0 & 0 & 0 & -b \end{bmatrix} F dt + B dW$$

In equation 1, $F=[f_x, f_y, \dot{f}_x, \dot{f}_y]^T$, B represents a diagonal matrix containing the noise deviation for each process, and dW represents the increment in a 4-dimensional Weiner process. In certain embodiments, the intelligent transportation routing system 104 trains constants a and b in equation 1 on real GPS traces to maximize similarity between simulated training GPS locations and actual GPS locations.

As further shown in FIG. 7, after transforming the simulated route locations 702 into the simulated training GPS locations 708, the intelligent transportation routing system 104 generates synthetic route tiles 710a-710c as training route tiles. In this particular embodiment, the synthetic route tiles 710a, 710b, and 710c respectively include a representation of the subsets of simulated training GPS locations 708a, 708b, and 708c. Although not shown, in certain embodiments, the synthetic route tiles 710a, 710b, and 710c respectively include a representation of both the subsets of simulated training GPS locations 708a, 708b, and 708c, and the subsets of simulated route locations 702a, 702b, and 702c. In some such embodiments, the subsets of simulated route locations 702a, 702b, and 702c represent equivalents of map-matched locations corresponding to the subsets of simulated training GPS locations 708a, 708b, and 708c.

In addition to generating the synthetic route tiles 710a-710c, the intelligent transportation routing system 104 also generates (synthetic) ground-truth-route-accuracy metrics 712a-712c. In particular, the intelligent transportation routing system 104 generates the ground-truth-route-accuracy metrics 712a, 712b, and 712c based on the synthetic route tiles, 710a, 710b, and 710c. When generating ground-truth-route-accuracy metrics for synthetic route tiles, the intelligent transportation routing system 104 determines an error value between a subset of simulated training GPS locations corresponding to a region and a subset of simulated route locations corresponding to the region. The intelligent transportation routing system 104 then compares the determined error value to a noise threshold.

For example, in certain embodiments, the intelligent transportation routing system 104 determines a ground-truth-route-accuracy metric by determining an error value using equation 2:

$$d(\hat{g}^{1:T}) = \sum_{i=2}^{T} d_{haversine}(\hat{g}^{i-1}, \hat{g}^i)$$

$$\delta(g^{1:T}) = \begin{cases} 0 & \text{if } \frac{|d(\hat{g}^{1:T}) - d(g^{1:T})|}{d(g^{1:T})} < \alpha \\ 1 & \text{otherwise} \end{cases}$$

In equation 2, $\hat{g}^{1:T}$ represents a subset of simulated training GPS locations, $g^{1:T}$ represents a subset of simulated route locations, and α represents a GPS-noise threshold.

After determining the ground-truth-route-accuracy metrics 712a-712c, the intelligent transportation routing system 104 can use the synthetic route tiles 710a-710c and the ground-truth-route-accuracy metrics 712a-712c to train an artificial neural network. Accordingly, in some embodiments, the training route tiles 402a-402n shown in FIG. 4 may be synthetic route tiles 710a-710c shown in FIG. 7. Similarly, the ground-truth-route-accuracy metrics 404a-404n shown in FIG. 4 may be the ground-truth-route-accuracy metrics 712a-712c.

Figure 8:
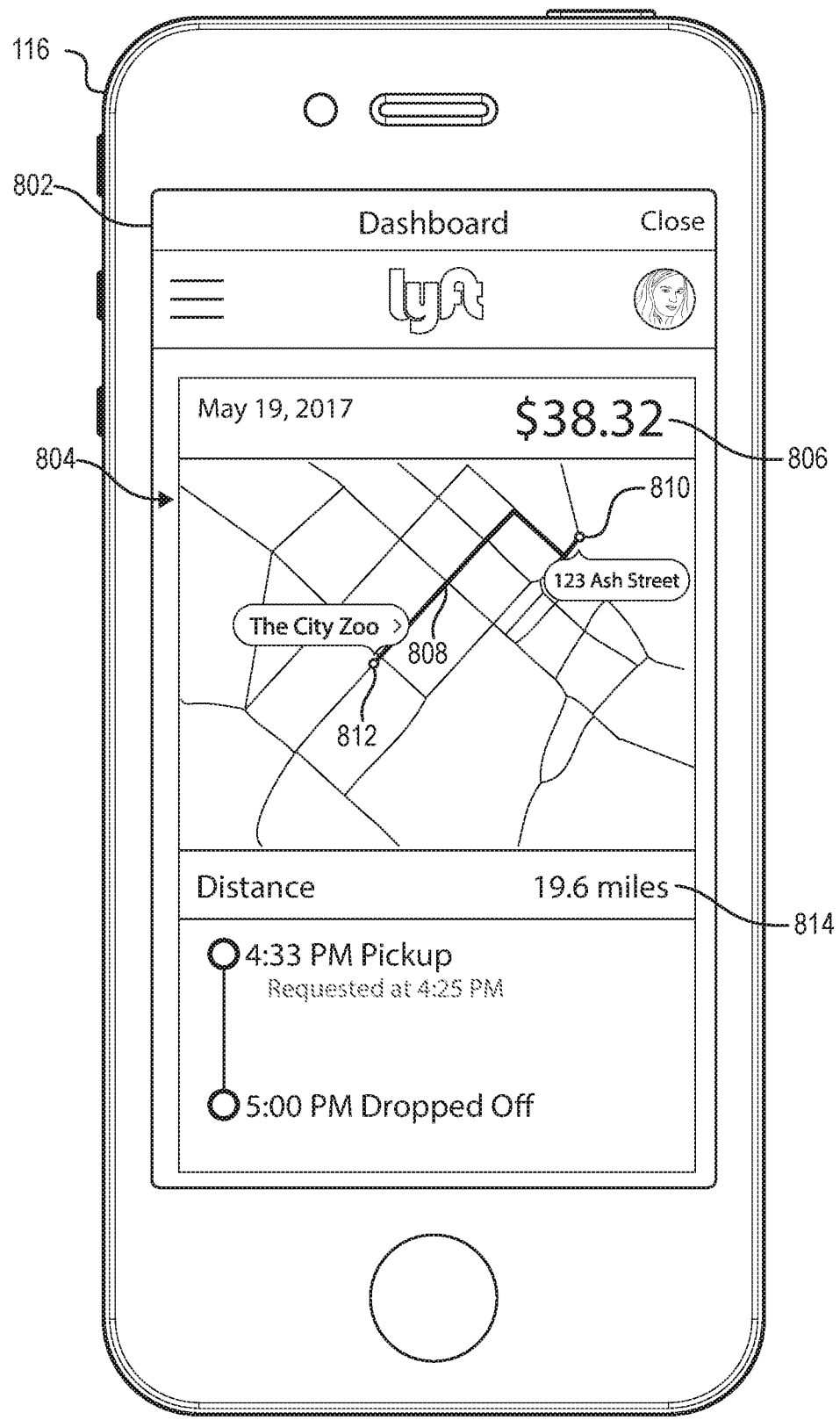
FIG. 8 illustrates a graphical user interface of a client device presenting a distance determination for a route traveled by a client device in accordance with one or more embodiments.

Turning now to FIG. 8, this figure illustrates an example of a distance determination that the intelligent transportation routing system 104 provides to a client device. Accordingly, FIG. 8 provides one example of updating a route. As described above, in certain embodiments, the intelligent transportation routing system 104 determines a distance traveled by a client device associated with a transportation vehicle. In some such embodiments, the intelligent transportation routing system 104 also provides the distance to one or more client devices for presentation. In FIG. 8, for example, the intelligent transportation routing system 104 (e.g., via the provider application 118) causes the provider client device 116 to present a distance 814 of a route 808 traveled by the provider client device 116.

As indicated by the route 808 in FIG. 8, the provider 120 transports the requestor 114 using the transportation vehicle 122. As the transportation vehicle 122 travels along the route 808 from a pickup location to a destination location, the provider client device 116 detects and transmits GPS locations to the intelligent transportation routing system 104. Additionally, or alternatively, the requestor client device 110 detects and transmits GPS locations to the intelligent transportation routing system 104 during travel. Consistent with the disclosure above, the intelligent transportation routing system 104 determines the distance 814 of the route 808 using the methods described above with reference to FIG. 6 (e.g., by applying a convolutional neural network to determine a route-accuracy metric for a plurality of regions, an accurate regional distance for each region, and a total distance reflecting the sum of regional distances). The intelligent transportation routing system 104 further sends the distance 814 to the provider client device 116 either during travel or after the provider client device 116 arrives at the destination location. In some such embodiments, the intelligent transportation routing system 104 repeatedly sends distance determinations to the provider client device 116 during travel.

As further shown in FIG. 8, the provider client device 116 presents a transportation summary corresponding to the route 808 within an application graphical user interface 804 of a screen 802. The transportation summary includes a graphical representation of the route 808, a pickup-location indicator 812, and a destination-location indicator 810. Additionally, the transportation summary further includes a price 806 charged for transportation based on the distance 814. As depicted in FIG. 8, in certain embodiments, the intelligent transportation routing system 104 causes the provider client device 116 to present the distance 814 together with the price 806 and the graphical representation of the route 808. Alternatively, the intelligent transportation routing system 104 causes the provider client device 116 to present one or more of the distance 814, the price 806, and the graphical representation of the route 808.

As suggested above, in addition (or in the alternative) to providing a distance to the provider client device 116, the intelligent transportation routing system 104 also provides the distance to the requestor client device 110 for presentation. Although not shown, the intelligent transportation routing system 104 (e.g., via the requestor application 112) causes the requestor client device 110 to present a distance 814 of the route 808 traveled by the requestor client device 110 and/or the provider client device 116.

In addition to determining a distance to a route, in some embodiments, the intelligent transportation routing system 104 modifies digital maps to more accurately reflect location data. FIGS. 9A-9B provide an example of one such modification as part of updating a route. FIG. 9A depicts a digital map 900a before adjustment. Conversely, FIG. 9B depicts a digital map 900b after adjustment.

As indicated by FIGS. 9A-9B, the intelligent transportation routing system 104 receives GPS locations from multiple client devices traveling along a road. Using these GPS locations, the intelligent transportation routing system 104 determines that subsets of GPS locations for a region 906 are relatively clean. For example, the intelligent transportation routing system 104 may determine route-accuracy metrics for a threshold number of route tiles that indicate the subsets of GPS locations are clean (e.g., based on applying a convolutional neural network to route tiles). The intelligent transportation routing system 104 further determines that the subsets of GPS locations indicate a path that differs from a corresponding map-matched road 904a. Based on this determination, the intelligent transportation routing system 104 modifies the map-matched road 904a to become a modified map-matched road 904b.

As shown in FIG. 9A, the digital map 900a includes GPS locations 902 received from a client device and the map-matched road 904a. The GPS locations 902 include a subset of GPS locations 902a corresponding to the region 906. The subset of GPS locations 902a are representative of the subset of GPS locations indicating a different path than the map-matched road 904a. Based on the subset of GPS locations 902a and other such subsets, the intelligent transportation routing system 104 adjusts the map-matched road 904a to correspond to a contour indicated by the subset of GPS locations 902a.

FIG. 9B depicts the digital map 900b comprising the modified map-matched road 904b. As shown in the region 906, the modified map-matched road 904b more accurately tracks the contour of the subset of GPS locations 902a. While FIG. 9B illustrates an adjustment to a roundabout within the region 906, in additional embodiments, the intelligent transportation routing system 104 adjusts map-matched roads in a variety of ways consistent with the disclosure above.

Although FIGS. 9A-9B illustrate modifying the location of roads within a digital map, the intelligent transportation routing system 104 can adjust a variety of features of a digital map based on a route-accuracy metric. For example, in one or more embodiments, the intelligent transportation routing system 104 can also modify traffic rules applicable to a digital map. To illustrate, the intelligent transportation routing system 104 can modify a one-way road to a two-lane road based on a route-accuracy metric (e.g., based on repeated determination that a path traveling in the wrong direction on the on-way road is an accurate path). Similarly, the intelligent transportation routing system 104 can adjust other traffic rules such as turn restrictions (or exit lanes) based on a route-accuracy metric (e.g., based on a repeated determination that a path traveling along a restricted turn path is an accurate path). The intelligent transportation routing system 104 can also modify other features, such as number of lanes or the existence of traffic lights within a digital map.

Figure 10:
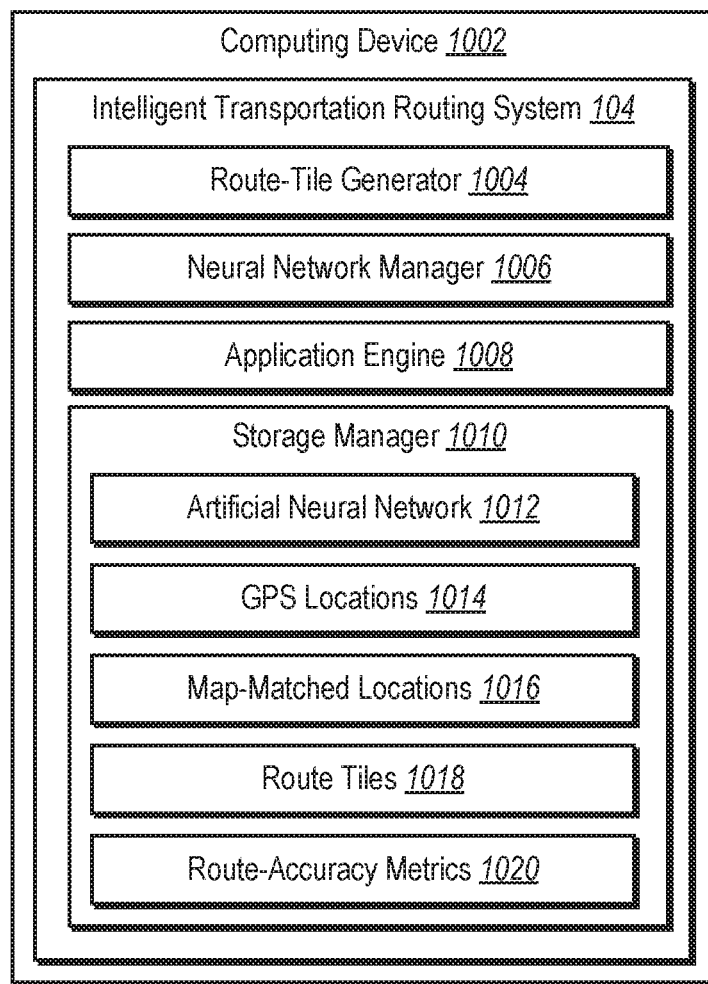
FIG. 10 illustrates a schematic diagram of the intelligent transportation routing system in accordance with one or more embodiments.

Turning now to FIG. 10, additional detail is provided regarding components and features of the intelligent transportation routing system 104. In particular, FIG. 10 shows a computing device 1002 implementing the intelligent transportation routing system 104. In some embodiments, the computing device 1002 comprises one or more servers (e.g., the server(s) 102) that support the intelligent transportation routing system 104. In other embodiments, the computing device 1002 is the requestor client device 110 or the provider client device 116. As the computing device 1002 suggests, in some embodiments, the server(s) 102 comprise the intelligent transportation routing system 104 or portions of the intelligent transportation routing system 104. In particular, in some instances, the server(s) 102 use the intelligent transportation routing system 104 to perform some or all of the functions described above with reference to FIGS. 1-9B.

As shown in FIG. 10, the computing device 1002 include the intelligent transportation routing system 104. The intelligent transportation routing system 104 in turn includes, but is not limited to, a route-tile generator 1004, a neural network manager 1006, an application engine 1008, and a storage manager 1010. The following paragraphs describe each of these components in turn.

As shown in FIG. 10, the route-tile generator 1004 generates training route tiles during training and/or route tiles for a trained artificial neural network. During training, the route-tile generator 1004 identifies training GPS locations for a training route traveled by a client device and training map-matched locations for the route. Similarly, during application, the route-tile generator 1004 identifies GPS locations for a route traveled by a client device and map-matched locations for the route. Additionally, the route-tile generator 1004 generates regions along a training route or route. After generating such regions, the route-tile generator further generates training route tiles (while training) and/or route tiles (during application). In some such implementations, the route-tile generator 1004 synthesizes route tiles as part of the training process.

Additionally, the neural network manager 1006 trains and/or utilizes an artificial neural network. For example, in some embodiments, the neural network manager 1006 receives training route tiles and trains an artificial neural network to predict route-accuracy metrics for regions based on the training route tiles. Relatedly, the neural network manager 1006 can also generate ground-truth-route-accuracy metrics. Additionally, the neural network manager 1006 also generates a trained artificial neural network. After training the artificial neural network, in some embodiments, the neural network manager 1006 also receives route tiles and utilizes the artificial neural network to determine route-accuracy metrics for regions based on route tiles.

As further shown in FIG. 10, the application engine 1008 utilizes route-accuracy metrics to perform various acts. For example, in some embodiments, the application engine 1008 determines a distance of a route based on route-accuracy metrics. Additionally, or alternatively, in some embodiments, the application engine 1008 determines a location of a client device, such as by determining a location of the client device within a particular region. In certain implementations, the application engine 1008 adjusts a digital map based on GPS locations.

As noted above, the intelligent transportation routing system 104 further includes the storage manager 1010. Among other things, the storage manager 1010 maintains an artificial neural network 1012, GPS locations 1014, map-matched locations 1016, route tiles 1018, and/or route-accuracy metrics 1020. In some embodiments, the artificial neural network 1012 comprises a machine learning model that can be trained. The storage manager 1010 maintains the artificial neural network 1012 both during and/or after the neural network manager 1006 generates a trained artificial neural network. Additionally, in some embodiments, the GPS locations 1014 comprise data files from which the route-tile generator 1004 identifies GPS locations. Relatedly, in certain embodiments, the map-matched locations 1016 comprise data files from which the route-tile generator 1004 identifies map-matched locations. Alternatively, the map-matched locations 1016 comprise map-matched locations generated by the route-tile generator 1004. In some embodiments, the route tiles 1018 include the training route tiles and/or the route tiles generated by the route-tile generator 1004. Finally, in certain implementations, the route-accuracy metrics 1020 comprise data files that include the ground-truth-route-accuracy metrics and/or the route-accuracy metrics generated by the neural network manager 1006.

Figure 11:
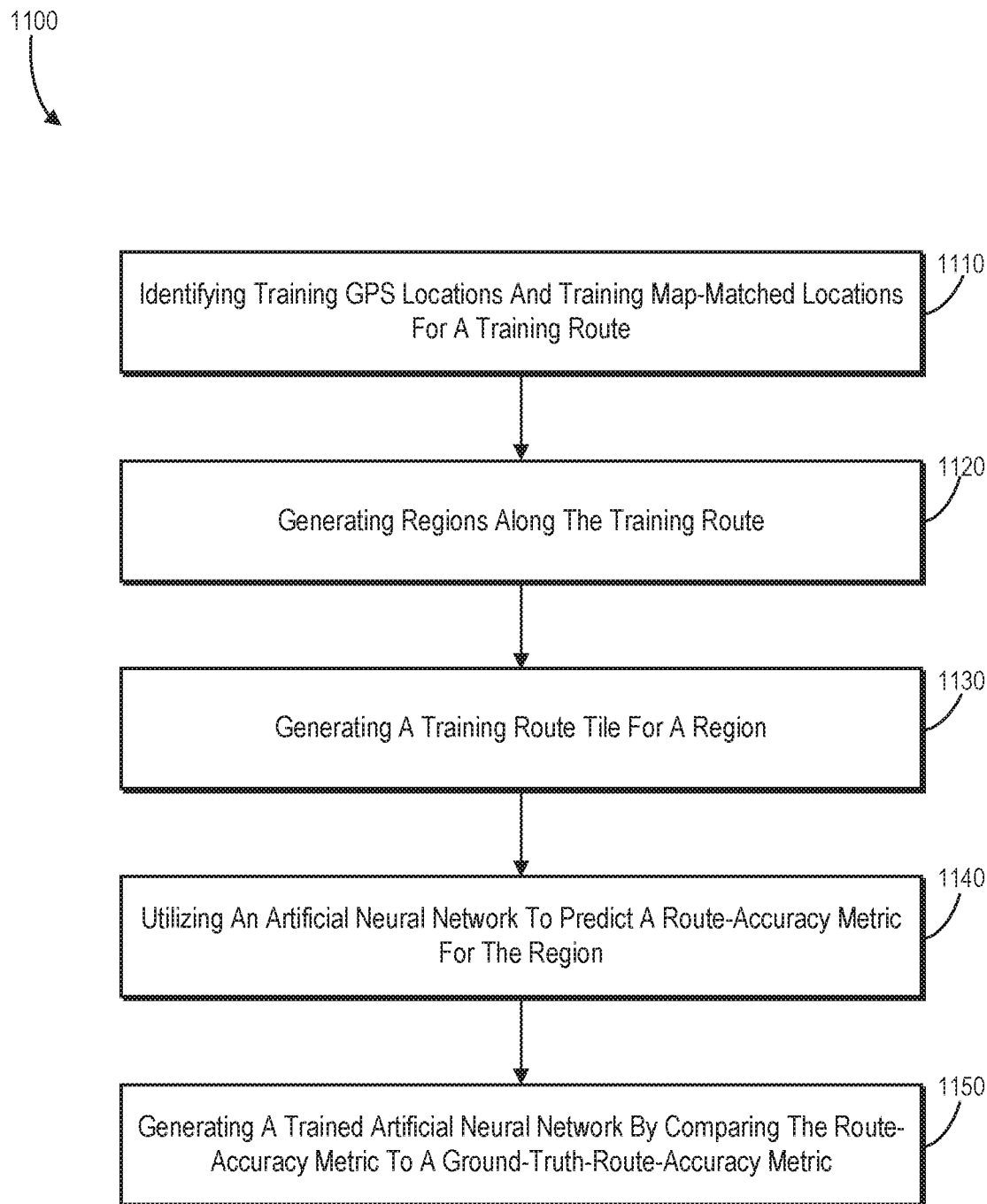
FIG. 11 illustrates a flowchart of a series of acts for training an artificial neural network to use training route tiles to predict route-accuracy metrics for regions along a training route traveled by a client device in accordance with one or more embodiments.

Turning now to FIG. 11, this figure illustrates a flowchart of a series of acts 1100 of training an artificial neural network to use training route tiles to predict route-accuracy metrics for regions along a training route traveled by a client device in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of identifying training GPS locations and training map-matched locations for a training route. For example, in some embodiments, the act 1110 includes identifying training GPS locations for a training route traveled by a client device and training map-matched locations for the training route, wherein the client device is associated with a transportation vehicle.

In some implementations, identifying the training GPS locations comprises receiving GPS locations detected by the client device along the training route. By contrast, in certain embodiments, the training GPS locations for the training route comprise simulated training GPS locations, and generating the simulated training GPS locations comprises: creating simulated route locations for the training route within a road network based on standard-traveling patterns of transportation vehicles; and generating the simulated training GPS locations by transforming the simulated route locations based on a GPS-noise model. Relatedly, in certain embodiments, generating the ground-truth-route-accuracy metric for the region comprises determining an error value between a subset of the simulated training GPS locations corresponding to the region and a subset of the simulated route locations corresponding to the region; and comparing the determined error value to a noise threshold.

As further shown in FIG. 11, the acts 1100 include an act 1120 of generating regions along the training route. For example, in some embodiments, the act 1120 includes generating a plurality of regions along the training route, wherein a region comprises a subset of training GPS locations and a subset of training map-matched locations.

As further shown in FIG. 11, the acts 1100 include an act 1130 of generating a training route tile for a region. For example, in some embodiments, the act 1130 includes generating a training route tile for the region based on the subset of training GPS locations and the subset of training map-matched locations.

As suggested above, in certain implementations, generating the training route tile for the region comprises generating a first image matrix comprising a representation of the subset of training GPS locations; and generating a second image matrix comprising a representation of the subset of training map-matched locations.

As further shown in FIG. 11, the acts 1100 include an act 1140 of utilizing an artificial neural network to predict a route-accuracy metric for the region. For instance, in some embodiments, the act 1140 includes utilizing an artificial neural network to predict a route-accuracy metric for the region based on the training route tile.

As further shown in FIG. 11, the acts 1100 include an act 1150 of generating a trained artificial neural network by comprising the route-accuracy metric to a ground-truth-route-accuracy metric. For example, in some embodiments, the act 1150 includes generating a trained artificial neural network by comparing the route-accuracy metric to a ground-truth-route-accuracy metric for the region.

In some such embodiments, the ground-truth-route-accuracy metric for the region comprises an accuracy classifier for the training route tile indicating a level of noise of the subset of training GPS locations; and the route-accuracy metric for the region comprises a predicted accuracy classifier for the training route tile indicating a predicted level of noise of the subset of training GPS locations.

In addition to the acts 1110-1150, in certain embodiments, the acts 1100 further include, generating the training map-matched locations by modifying the training GPS locations to correspond to roads within a digital map.

When training the artificial neural network, in one or more embodiments, the acts 1100 further include determining a first estimated path of the client device within the region based on the subset of training GPS locations and a second estimated path of the client device with the region based on the subset of training map-matched locations, wherein: the first image matrix comprises a first set of pixels that represent the first estimated path of the client device within the region and a second set of pixels that represent positions outside of the first estimated path within the region; and the second image matrix comprises a third set of pixels that represent the second estimated path of the client device within the region and a fourth set of pixels that represent positions outside of the second estimated path within the region.

As noted above, in some embodiments, the intelligent transportation routing system 104 analyzes multiple training route tiles. For example, in one or more embodiments, the acts 1100 further include utilizing the artificial neural network to predict an additional route-accuracy metric for an additional region based on an additional training route tile; and generating the trained artificial neural network by comparing the additional route-accuracy metric to an additional ground-truth-route-accuracy metric.

Figure 12:
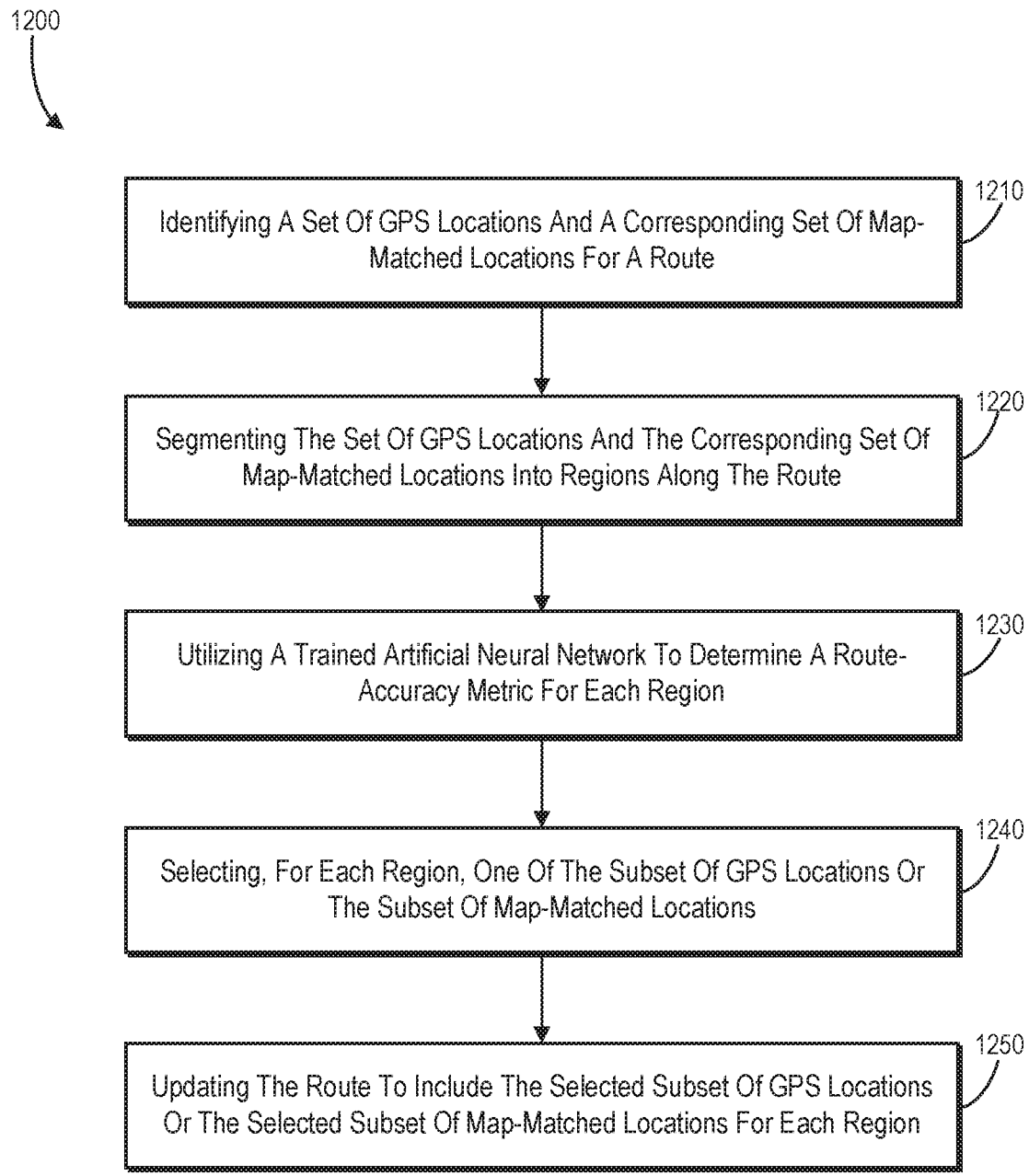
FIG. 12 illustrates a flowchart of a series of acts for using an artificial neural network to determine route-accuracy metrics for regions along a route traveled by a client device in accordance with one or more embodiments.

Turning now to FIG. 12, this figure illustrates a flowchart of a series of acts 1200 of using an artificial neural network to determine route-accuracy metrics for regions along a route traveled by a client device in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable storage medium can comprise instructions that, when executed by one or more processors, cause a computing device to perform the acts depicted in FIG. 12. In still further embodiments, a system can perform the acts of FIG. 12.

As shown in FIG. 12, the acts 1200 include an act 1210 of identifying a set of GPS locations and a corresponding set of map-matched locations for a route. For example, in some embodiments, the act 1210 includes identifying a set of GPS locations and a corresponding set of map-matched locations for a route traveled by a client device. In certain implementations, the client device is associated with a transportation vehicle.

As further shown in FIG. 12, the acts 1200 include an act 1220 of segmenting the set of GPS locations and the corresponding set of map-matched locations into regions along the route. For instance, in certain embodiments, the act 1220 includes segmenting the set of GPS locations and the corresponding set of map-matched locations into one or more regions along the route, wherein each region of the one or more regions comprises a subset of GPS locations and a subset of map-matched locations.

As further shown in FIG. 12, the acts 1200 include an act 1230 of utilizing a trained artificial neural network to determine a route-accuracy metric for each region. As noted above, the route-accuracy metric may take a variety of forms. For example, in some embodiments, the route-accuracy metric comprises a classifier indicating the subset of GPS locations; and determining the distance of the route based on the route-accuracy metric comprises determining a regional distance traveled by the client device within the region based on the subset of GPS locations. In some such embodiments, the acts 1200 further include, based on the classifier indicating the subset of GPS locations, adjusting a digital map for the region to correspond to the subset of GPS locations.

As further shown in FIG. 12, the acts 1200 include an act 1240 of selecting, for each region, one of the subset of GPS locations or the subset of map-matched locations. For instance, in some embodiments, the act 1240 includes selecting, for each region, one of the subset of GPS locations or the subset of map-matched locations based on the route-accuracy metric.

Finally, as shown in FIG. 12, the acts 1200 include an act 1250 of updating the route to include the selected subset of GPS locations or the selected subset of map-matched locations for each region. For example, in some embodiments, updating the route comprises determining a distance of the route based on the selected subset of GPS locations or the selected subset of map-matched locations for each region. As another example, in certain implementations, updating the route comprises adjusting a digital map for the region to correspond to the selected subset of GPS locations or the selected subset of map-matched locations for each region.

In addition to the acts 1210-1250, in certain embodiments, the acts 1200 further include generating, for each region, a route tile for the region based on the subset of GPS locations for the region and the subset of map-matched locations for the region. In some such embodiments, utilizing the trained artificial neural network to determine the route-accuracy metric for each region comprises utilizing the trained artificial neural network to analyze the route tile for the region to generate the route-accuracy metric for the region.

Relatedly, in certain implementations, generating the route tile for each region comprises generating a first image matrix for the region comprising a representation of the subset of GPS locations for the region; and generating a second image matrix for the region comprising a representation of the subset of map-matched locations for the region. In some such implementations, generating the route tile for each region comprises determining a first estimated path of the client device within the region based on the subset of GPS locations for the region and a second estimated path of the client device with the region based on the subset of map-matched locations for the region; the first image matrix comprises a first set of pixels that represent the first estimated path of the client device within the region and a second set of pixels that represent positions outside of the first estimated path within the region; and the second image matrix comprises a third set of pixels that represent the second estimated path of the client device within the region and a fourth set of pixels that represent positions outside of the second estimated path within the region.

As noted above, the intelligent transportation routing system 104 trains an artificial network. In some such embodiments, generating the trained artificial neural network comprises generating a training route tile for a training region along a training route based on training GPS locations and corresponding training map-matched locations; utilizing an artificial neural network to predict a route-accuracy metric for the training region based on the training route tile; and generating the trained artificial neural network by comparing the route-accuracy metric to a ground-truth-route-accuracy metric for the training region.

Relatedly, in some implementations, generating the simulated training GPS locations comprises creating simulated route locations for the training route within a road network based on standard-traveling patterns of transportation vehicles; and generating the simulated training GPS locations by transforming the simulated route locations based on a GPS-noise model. Additionally, in one or more embodiments, generate the ground-truth-route-accuracy metric for the training region comprises determining an error value between the simulated training GPS locations and the simulated route locations; and comparing the determined error value to a noise threshold.

In some embodiments, the acts 1200 include an alternative set of acts. For example, in some embodiments, the acts 1200 include identifying GPS locations and map-matched locations for a route. For example, in some embodiments, the acts 1200 include identifying GPS locations for a route traveled by a client device and map-matched locations for the route, wherein the client device is associated with a transportation vehicle.

Additionally, in certain embodiments, the acts 1200 include generating regions along the route. For instance, in certain embodiments, the acts 1200 include generating a plurality of regions along the route, wherein a region comprises a subset of GPS locations and a subset of map-matched locations.

Moreover, in some implementations, the acts 1200 include generating a route tile for the region. For example, in some implementations, the act 1200 includes generating a route tile for the region based on the subset of GPS locations and the subset of map-matched locations.

Further, in certain implementations, the acts 1200 include utilizing an artificial neural network to determine a route-accuracy metric for the region. For instance, in some embodiments, the acts 1200 includes utilizing an artificial neural network to determine a route-accuracy metric for the region based on the route tile. In certain embodiments, the route-accuracy metric for the region comprises an accuracy classifier for the route tile indicating a level of noise of the subset of GPS locations.

Finally, in some such embodiments, the acts 1200 include determining a distance of the route based on the route-accuracy metric. As noted above, the route-accuracy metric may take a variety of forms. For example, in some embodiments, the route-accuracy metric comprises a classifier indicating the subset of GPS locations; and determining the distance of the route based on the route-accuracy metric comprises determining a regional distance traveled by the client device within the region based on the subset of GPS locations. In some such embodiments, the acts 1200 further include, based on the classifier indicating the subset of GPS locations, adjusting a digital map for the region to correspond to the subset of GPS locations.

Alternatively, in some embodiments, the route-accuracy metric comprises a classifier indicating the subset of map-matched locations; and determining the distance of the route based on the route-accuracy metric comprises determining a regional distance traveled by the client device within the region based on the subset of map-matched locations.

Additionally, in certain embodiments, the route-accuracy metric for the region comprises a regional distance traveled by the client device within the region based on the route tile; and determining the distance of the route based on the route-accuracy metric comprises determining the distance of the route based on the regional distance traveled by the client device within the region.

As suggested above, in some embodiments, the acts 1200 further include utilizing the artificial neural network to determine an additional route-accuracy metric for an additional region based on an additional a route tile; and determining the distance of the route based on the additional route-accuracy metric for the additional region and the route-accuracy metric for the region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
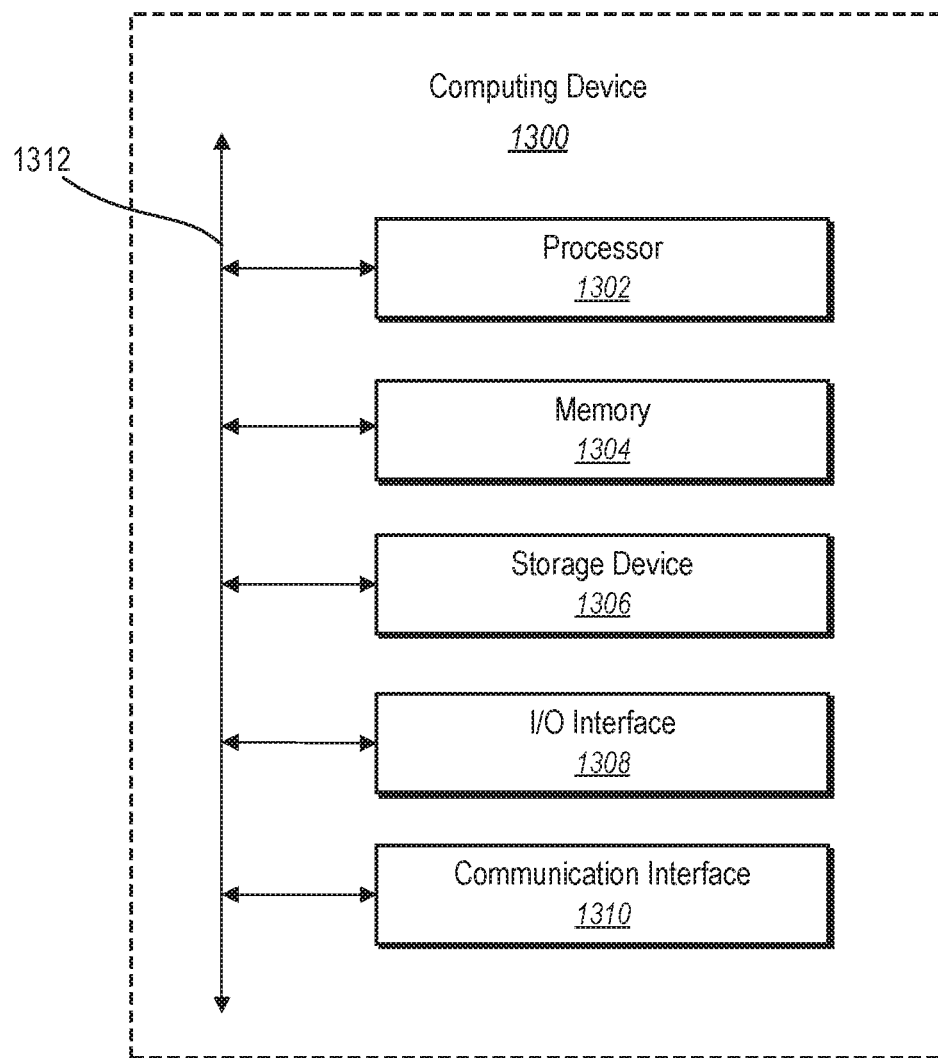
FIG. 13 illustrates a block diagram of a computing device in accordance with one or more embodiments.

FIG. 13 illustrates, in block diagram form, an exemplary computing device 1300 that may be configured to perform one or more of the processes described above. One will appreciate that the intelligent transportation routing system 104 can comprise implementations of the computing device 1300, including, but not limited to, the server(s) 102, the requestor client devices 110, and the provider client device 116. As shown by FIG. 13, the computing device can comprise a processor 1302, memory 1304, a storage device 1306, an I/O interface 1308, and a communication interface 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s) 1302. The memory 1304 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 for storing data or instructions. As an example, and not by way of limitation, storage device 1306 can comprise a non-transitory storage medium described above. The storage device 1306 may include a hard disk drive ("HDD"), flash memory, a Universal Serial Bus ("USB") drive or a combination of these or other storage devices.

The computing device 1300 also includes one or more input or output ("I/O") interface 1308, which are provided to allow a user (e.g., requestor or provider) to provide input to (such as user strokes), receive output from, and otherwise transfer data to and from the computing device 1300. These I/O interface 1308 may include a mouse, keypad or a keyboard, a touch screen, camera, optical scanner, network interface, modem, other known I/O devices or a combination of such I/O interface 1308. The touch screen may be activated with a stylus or a finger.

The I/O interface 1308 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include a bus 1312. The bus 1312 can comprise hardware, software, or both that couples components of computing device 1300 to each other.

Figure 14:
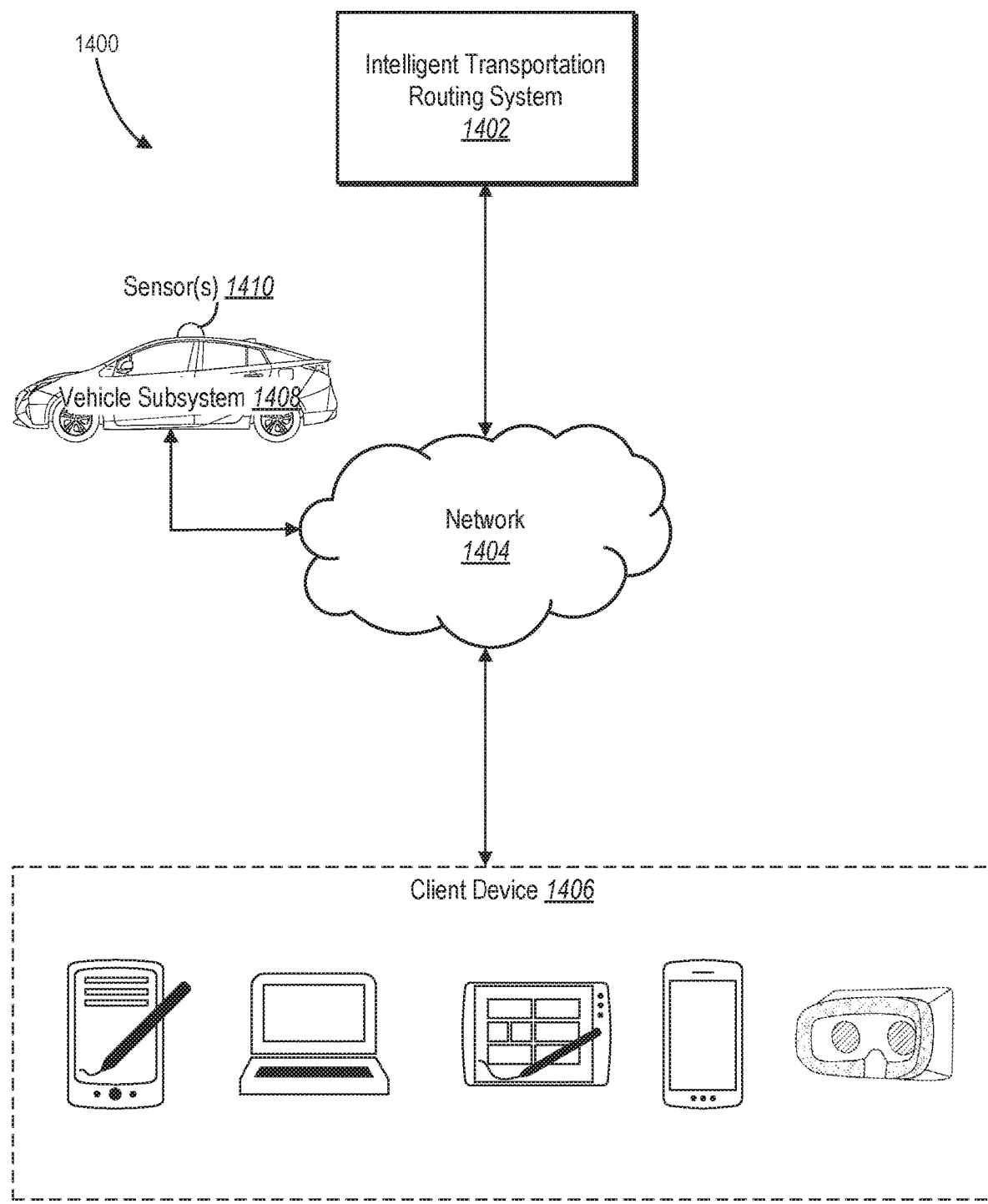
FIG. 14 illustrates an example environment for an intelligent transportation routing system in accordance with one or more embodiments.

FIG. 14 illustrates an example network environment 1400 of an intelligent transportation routing system. The network environment 1400 includes an intelligent transportation routing system 1402, a client device 1406, and a vehicle subsystem 1408 connected to each other by a network 1404. Although FIG. 14 illustrates a particular arrangement of the intelligent transportation routing system 1402, client device 1406, vehicle subsystem 1408, and network 1404, this disclosure contemplates any suitable arrangement of the intelligent transportation routing system 1402, client device 1406, vehicle subsystem 1408, and network 1404. As an example, and not by way of limitation, two or more of the client device 1406, intelligent transportation routing system 1402, and vehicle subsystem 1408 communicate directly, bypassing network 1404. As another example, two or more of the client device 1406, intelligent transportation routing system 1402, and vehicle subsystem 1408 may be physically or logically co-located with each other in whole or in part. Moreover, although FIG. 14 illustrates a particular number of client devices 1406, intelligent transportation routing systems 1402, vehicle subsystems 1408, and networks 1404, this disclosure contemplates any suitable number of client devices 1406, intelligent transportation routing systems 1402, vehicle subsystems 1408, and networks 1404. As an example, and not by way of limitation, network environment 1400 may include multiple client devices 1406, intelligent transportation routing systems 1402, vehicle subsystems 1408, and networks 1404.

This disclosure contemplates any suitable network 1404. As an example, and not by way of limitation, one or more portions of network 1404 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1404.

Links may connect client device 1406, intelligent transportation routing system 1402, and vehicle subsystem 1408 to network 1404 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1400. One or more first links may differ in one or more respects from one or more second links.

In particular embodiments, client device 1406 may be an electronic device including hardware, software, or embedded logic components or a combination of two or more such components and capable of carrying out the appropriate functionalities implemented or supported by client device 1406. As an example, and not by way of limitation, a client device 1406 may include any of the computing devices discussed above in relation to FIG. 13. A client device 1406 may enable a network user at client device 1406 to access network 1404. A client device 1406 may enable its user to communicate with other users at other client devices 1406.

In particular embodiments, client device 1406 may include a requestor application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1406 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1406 one or more Hyper Text Markup Language ("HTML") files responsive to the HTTP request. Client device 1406 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, intelligent transportation routing system 1402 may be a network-addressable computing system that can host a transportation matching network. Intelligent transportation routing system 1402 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the intelligent transportation routing system 1402. In addition, the dynamic transportation matching system may manage identities of service requestors such as users/requestors. In particular, the dynamic transportation matching system may maintain requestor data such as driving/riding histories, personal data, or other user data in addition to navigation and/or traffic management services or other location services (e.g., GPS services).

In particular embodiments, the intelligent transportation routing system 1402 may manage transportation matching services to connect a user/requestor with a vehicle and/or provider. By managing the transportation matching services, the intelligent transportation routing system 1402 can manage the distribution and allocation of resources from the vehicle subsystems 108a and 108n and user resources such as GPS location and availability indicators, as described herein.

Intelligent transportation routing system 1402 may be accessed by the other components of network environment 1400 either directly or via network 1404. In particular embodiments, intelligent transportation routing system 1402 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, intelligent transportation routing system 1402 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1406, or an intelligent transportation routing system 1402 to manage, retrieve, modify, add, or delete, the information stored in data store.

In particular embodiments, intelligent transportation routing system 1402 may provide users with the ability to take actions on various types of items or objects, supported by intelligent transportation routing system 1402. As an example, and not by way of limitation, the items and objects may include transportation matching networks to which users of intelligent transportation routing system 1402 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in intelligent transportation routing system 1402 or by an external system of a third-party system, which is separate from intelligent transportation routing system 1402 and coupled to intelligent transportation routing system 1402 via a network 1404.

In particular embodiments, intelligent transportation routing system 1402 may be capable of linking a variety of entities. As an example, and not by way of limitation, intelligent transportation routing system 1402 may enable users to interact with each other or other entities, or to allow users to interact with these entities through an application programming interfaces ("API") or other communication channels.

In particular embodiments, intelligent transportation routing system 1402 may include a variety of servers, subsystems, programs, modules, logs, and data stores. In particular embodiments, intelligent transportation routing system 1402 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Intelligent transportation routing system 1402 may also include suitable components such as network interfaces, security mechanisms, load balancers, failover servers, management-and-network-operations consoles, other suitable components, or any suitable combination thereof. In particular embodiments, intelligent transportation routing system 1402 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between intelligent transportation routing system 1402 and one or more client devices 1406. An action logger may be used to receive communications from a web server about a user's actions on or off intelligent transportation routing system 1402. In conjunction with the action log, a third-party-content-object log may be maintained of user exposures to third-party-content objects. A notification controller may provide information regarding content objects to a client device 1406. Information may be pushed to a client device 1406 as notifications, or information may be pulled from client device 1406 responsive to a request received from client device 1406. Authorization servers may be used to enforce one or more privacy settings of the users of intelligent transportation routing system 1402. A privacy setting of a user determines how particular information associated with a user can be shared. The authorization server may allow users to opt in to or opt out of having their actions logged by intelligent transportation routing system 1402 or shared with other systems, such as, for example, by setting appropriate privacy settings. Third-party-content-object stores may be used to store content objects received from third parties. Location stores may be used for storing location information received from client devices 1406 associated with users.

In addition, the vehicle subsystem 1408 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1408 can include an autonomous vehicle—i.e., a vehicle that does not require a human operator. When a transportation vehicle is an autonomous vehicle, the transportation vehicle may include additional components not depicted in FIG. 1 or FIG. 14, such as location components, one or more sensors by which the autonomous vehicle navigates, and/or other components necessary to navigate without a provider (or with minimal interactions with a provider). In these embodiments, the vehicle subsystem 1408 can perform maneuvers, communicate, and otherwise function without the aid of a human provider, in accordance with available technology.

Additionally, in some embodiments, the vehicle subsystem 1408 includes a hybrid self-driving vehicle with both self-driving functionality and some human operator interaction. This human operator interaction may work in concert with or independent of the self-driving functionality. In other embodiments, the vehicle subsystems 1408 includes an autonomous provider that acts as part of the transportation vehicle, such as a computer-based navigation and driving system that acts as part of a transportation vehicle. Regardless of whether a transportation vehicle is associated with a provider, a transportation vehicle optionally includes a locator device, such as a GPS device, that determines the location of the transportation vehicle within the vehicle subsystem 1408.

In particular embodiments, the vehicle subsystem 1408 may include one or more sensors incorporated therein or associated thereto. For example, sensor(s) 1410 can be mounted on the top of the vehicle subsystem 1408 or else can be located within the interior of the vehicle subsystem 1408. In certain embodiments, the sensor(s) 1410 can be located in multiple areas at once—i.e., split up throughout the vehicle subsystem 1408 so that different components of the sensor(s) 1410 can be placed in different locations in accordance with optimal operation of the sensor(s) 1410. In these embodiments, the sensor(s) 1410 can include a LIDAR sensor and an inertial measurement unit ("IMU") including one or more accelerometers, one or more gyroscopes, and one or more magnetometers. The sensor(s) 1410 can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1408 may include a communication device capable of communicating with the client device 1406 and/or the intelligent transportation routing system 1402. For example, the vehicle subsystem 1408 can include an on-board computing device communicatively linked to the network 1404 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A system comprising:
   at least one processor; and
   at least one non-transitory computer readable storage medium storing instructions that, when executed by the at least one processor, cause the system to:
   identify a set of GPS locations and a corresponding set of map-matched locations for a route traveled by a client device;
   segment the set of GPS locations and the corresponding set of map-matched locations into a set of regions along the route, wherein each region from the set of regions comprises a subset of GPS locations and a subset of map-matched locations;
   analyze a region from the set of regions utilizing a trained artificial neural network to select between a particular subset of GPS locations and a particular subset of map-matched locations for the region; and
   update the route to include the particular subset of GPS locations or the particular subset of map-matched locations selected for the region.

2. The system of claim 1, further comprising instructions that, when executed by the at least one processor, cause the system to generate a route tile for each region from the set of regions based on the subset of GPS locations for each region and the subset of map-matched locations for each region.

3. The system of claim 2, further comprising instructions that, when executed by the at least one processor, cause the system to utilize the trained artificial neural network to analyze the route tile for the region to generate a route-accuracy metric indicating the particular subset of GPS locations or the particular subset of map-matched locations for the region.

4. The system of claim 3, further comprising instructions that, when executed by the at least one processor, cause the system to generate the route tile for the region by:
   generating a first image matrix for the region comprising a representation of the particular subset of GPS locations for the region; and
   generating a second image matrix for the region comprising a representation of the particular subset of map-matched locations for the region.

5. The system of claim 4, further comprising instructions that, when executed by the at least one processor, cause the system to generate the route tile for the region by determining a first estimated path of the client device within the region based on the particular subset of GPS locations for the region and a second estimated path of the client device within the region based on the particular subset of map-matched locations for the region, wherein:
   the first image matrix comprises a first set of pixels that represent the first estimated path of the client device within the region and a second set of pixels that represent positions outside of the first estimated path within the region; and
   the second image matrix comprises a third set of pixels that represent the second estimated path of the client device within the region and a fourth set of pixels that represent positions outside of the second estimated path within the region.

6. The system of claim 1, further comprising instructions that, when executed by the at least one processor, cause the system to update the route by determining a distance of the route based on the particular subset of GPS locations or the particular subset of map-matched locations selected for the region.

7. The system of claim 1, further comprising instructions that, when executed by the at least one processor, cause the system to update the route by adjusting a digital map for the region to correspond to the particular subset of GPS locations or the particular subset of map-matched locations selected for the region.

8. The system of claim 1, further comprising instructions that, when executed by the at least one processor, cause the system to generate the trained artificial neural network by:
   generating a training route tile for a training region along a training route based on training GPS locations and corresponding training map-matched locations;
   utilizing an artificial neural network to predict a route-accuracy metric for the training region based on the training route tile; and
   generating the trained artificial neural network by comparing the route-accuracy metric to a ground-truth-route-accuracy metric for the training region.

9. The system of claim 8, wherein the training GPS locations comprise simulated training GPS locations, the system further comprising instructions that, when executed by the at least one processor, cause the system to generate the simulated training GPS locations by:
   creating simulated route locations for the training route within a road network based on standard-traveling patterns of transportation vehicles; and
   generating the simulated training GPS locations by transforming the simulated route locations based on a GPS-noise model.

10. The system of claim 9, further comprising instructions that, when executed by the at least one processor, cause the system to generate the ground-truth-route-accuracy metric for the training region by:
    determining an error value between the simulated training GPS locations and the simulated route locations; and
    comparing the determined error value to a noise threshold.

11. A method comprising:
    identifying a set of GPS locations and a corresponding set of map-matched locations for a route traveled by a client device;
    segmenting the set of GPS locations and the corresponding set of map-matched locations into a set of regions along the route, wherein each region from the set of regions comprises a subset of GPS locations and a subset of map-matched locations;
    analyzing a region from the set of regions utilizing a trained artificial neural network to select between a particular subset of GPS locations or a particular subset of map-matched locations for the region; and updating the route to include the particular subset of GPS locations or the particular subset of map-matched locations selected for the region.

12. The method of claim 11, further comprising generating a route tile for each region from the set of regions based on the subset of GPS locations for each region and the subset of map-matched locations for each region.

13. The method of claim 12, further comprising utilizing the trained artificial neural network to analyze the route tile for the region to generate a route-accuracy metric indicating the particular subset of GPS locations or the particular subset of map-matched locations for the region.

14. The method of claim 12, wherein generating the route tile for the region comprises:

generating a first image matrix for the region comprising a representation of the particular subset of GPS locations for the region; and generating a second image matrix for the region comprising a representation of the particular subset of map-matched locations for the region.

15. The method of claim 14, wherein:

generating the route tile for the region comprises determining a first estimated path of the client device within the region based on the particular subset of GPS locations for the region and a second estimated path of the client device within the region based on the particular subset of map-matched locations for the region;

the first image matrix comprises a first set of pixels that represent the first estimated path of the client device within the region and a second set of pixels that represent positions outside of the first estimated path within the region; and the second image matrix comprises a third set of pixels that represent the second estimated path of the client device within the region and a fourth set of pixels that represent positions outside of the second estimated path within the region.

16. A non-transitory computer readable medium storing instructions thereon that, when executed by at least one processor, cause a system to:

identify a set of GPS locations and a corresponding set of map-matched locations for a route traveled by a client device;

segment the set of GPS locations and the corresponding set of map-matched locations into a set of regions along the route, wherein each region from the set of regions comprises a subset of GPS locations and a subset of map-matched locations;

analyze a region from the set of regions utilizing a trained artificial neural network to select between a particular subset of GPS locations and a particular subset of map-matched locations for the region; and update the route to include the particular subset of GPS locations or the particular subset of map-matched locations selected for the region.

17. The non-transitory computer readable medium of claim 16, further comprising instructions that, when executed by the at least one processor, cause the system to generate a route tile for each region from the set of regions based on the subset of GPS locations for each region and the subset of map-matched locations for each region.

18. The non-transitory computer readable medium of claim 17, further comprising instructions that, when executed by the at least one processor, cause the system to utilize the trained artificial neural network to analyze the route tile for the region to generate a route-accuracy metric indicating the particular subset of GPS locations or the particular subset of map-matched locations for the region.

19. The non-transitory computer readable medium of claim 17, further comprising instructions that, when executed by the at least one processor, cause the system to generate the route tile for the region by:

generating a first image matrix for the region comprising a representation of the particular subset of GPS locations for the region; and generating a second image matrix for the region comprising a representation of the particular subset of map-matched locations for the region.

20. The non-transitory computer readable medium of claim 19, further comprising instructions that, when executed by the at least one processor, cause the system to generate the route tile for the region by determining a first estimated path of the client device within the region based on the particular subset of GPS locations for the region and a second estimated path of the client device within the region based on the particular subset of map-matched locations for the region, wherein:

the first image matrix comprises a first set of pixels that represent the first estimated path of the client device within the region and a second set of pixels that represent positions outside of the first estimated path within the region; and the second image matrix comprises a third set of pixels that represent the second estimated path of the client device within the region and a fourth set of pixels that represent positions outside of the second estimated path within the region.

* * * * *